M. H. MANN & A. H. HAWLEY.
CALCULATING AND MONEY PAYING MACHINE.
APPLICATION FILED SEPT. 1, 1915.

1,298,751.

Patented Apr. 1, 1919.
20 SHEETS—SHEET 1

WITNESS
Ells Wagner

INVENTORS
M. H. Mann
A. H. Hawley
BY
J. H. Cobb
ATTORNEY

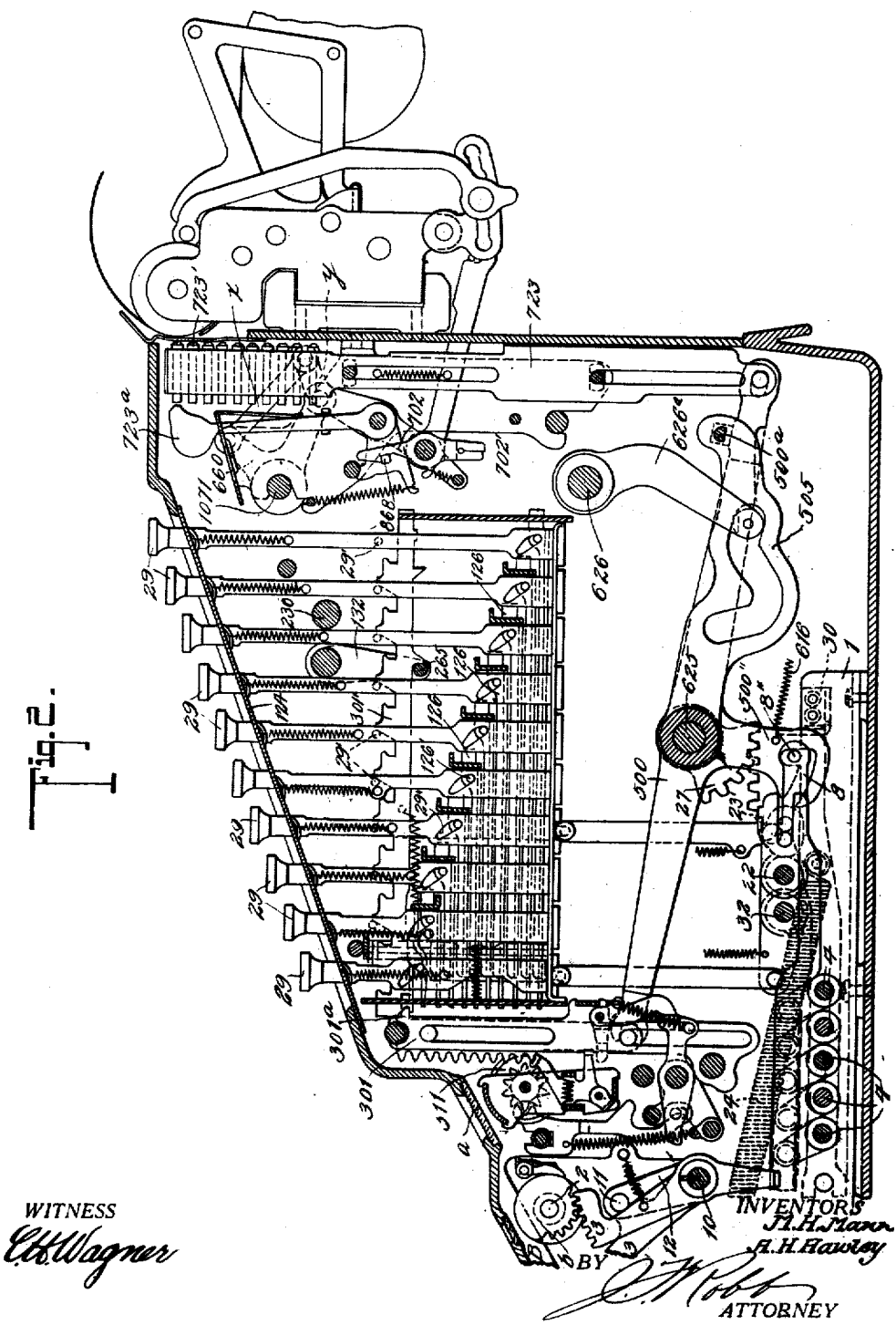

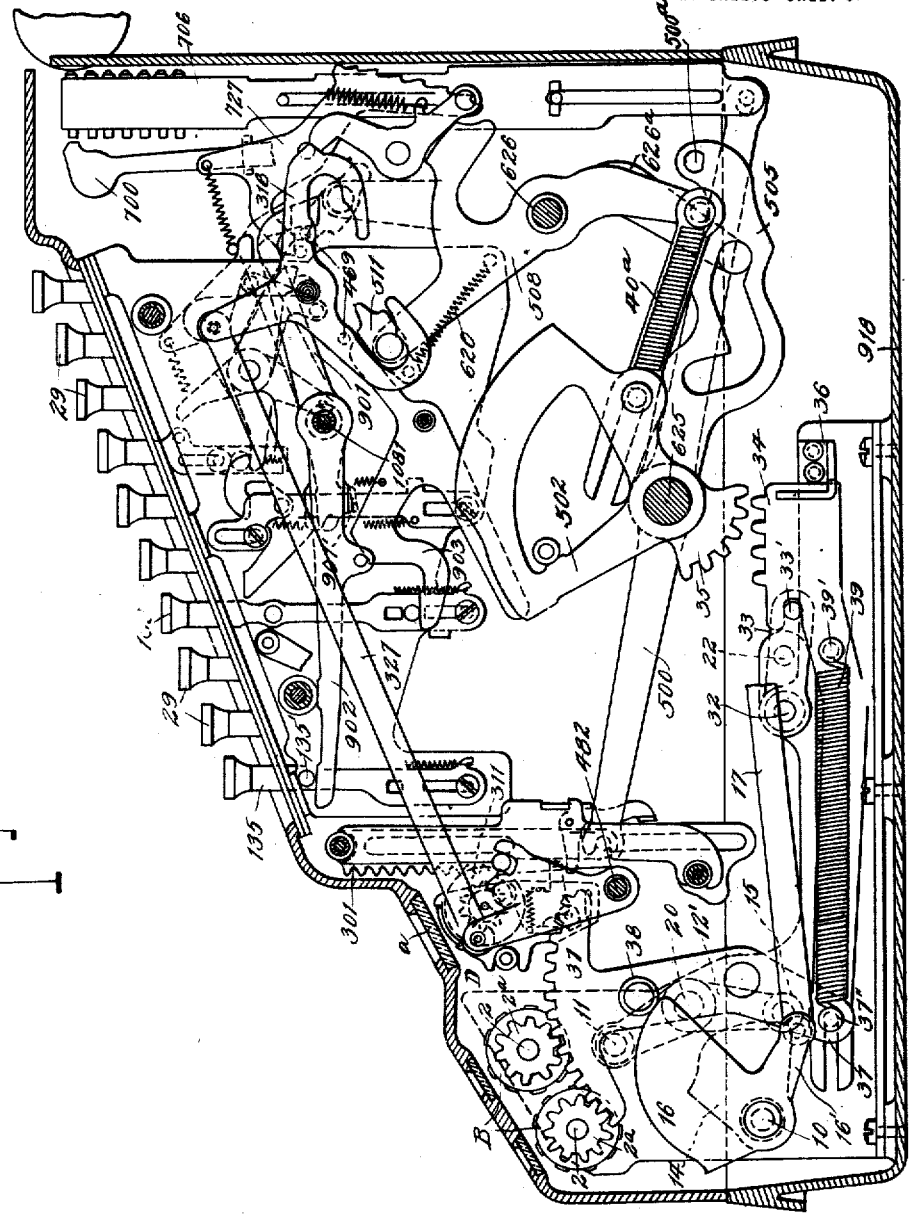

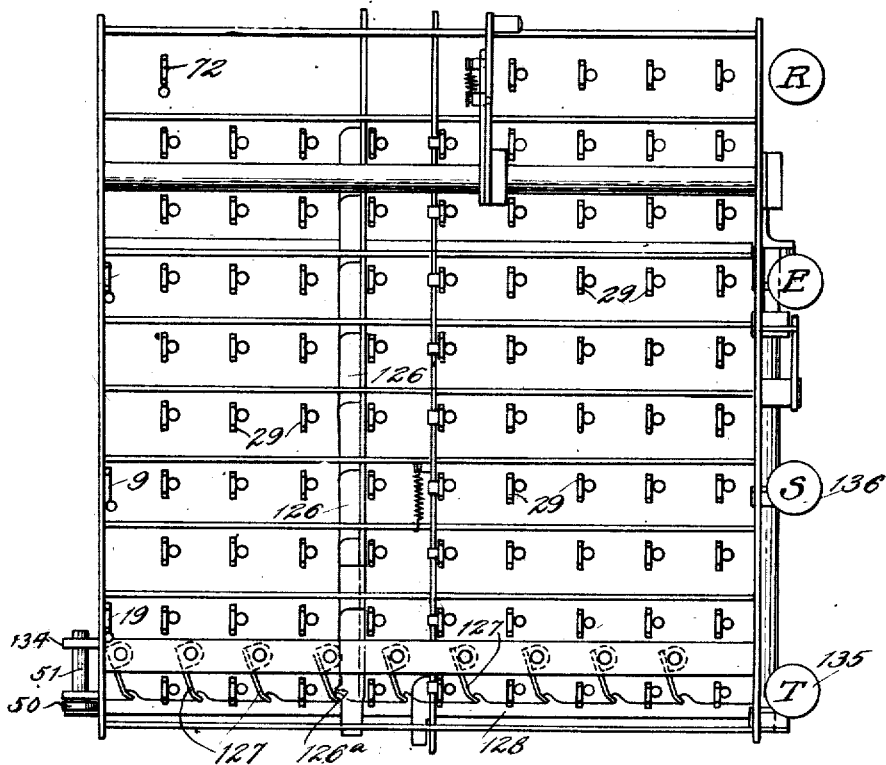

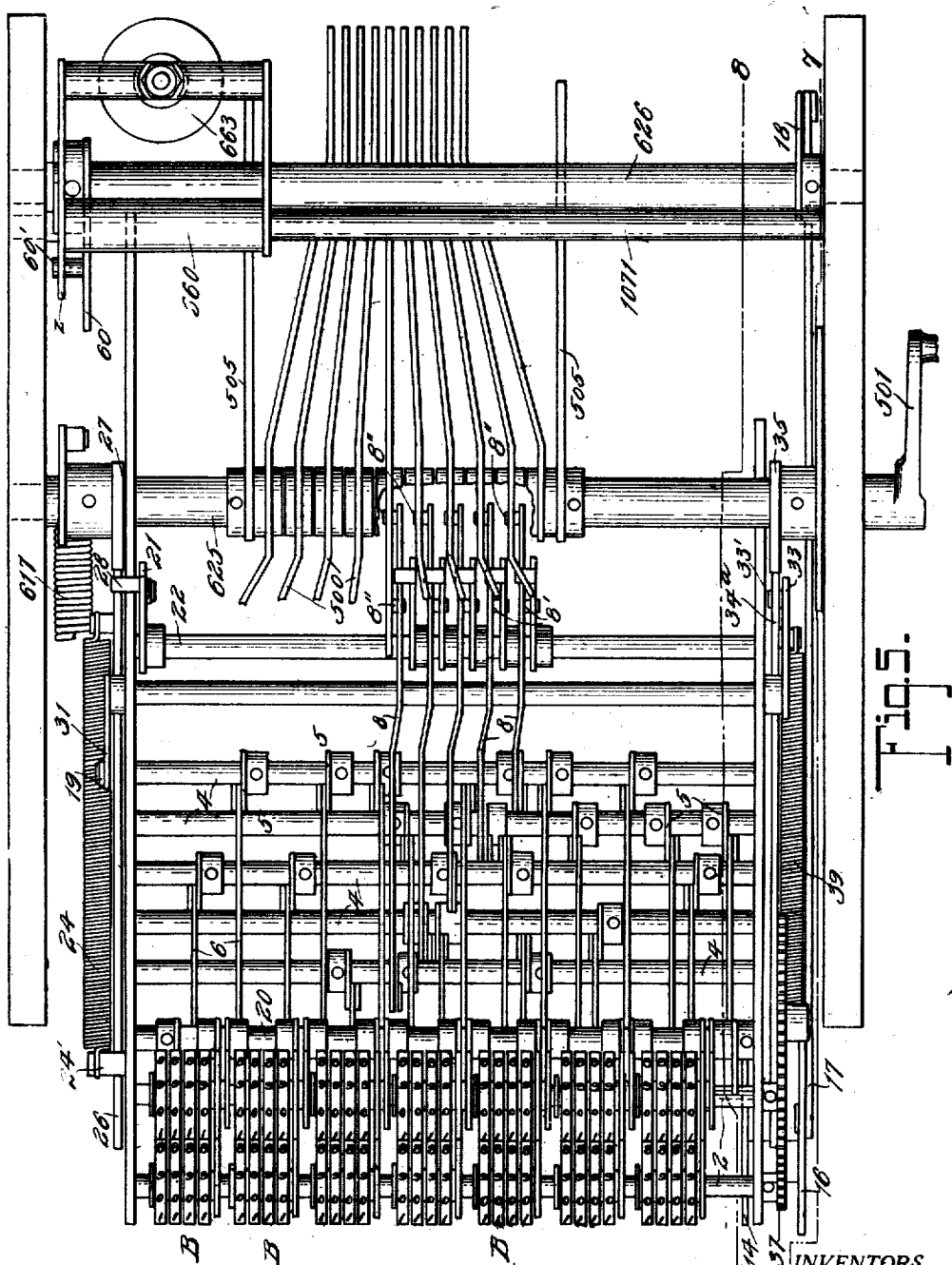

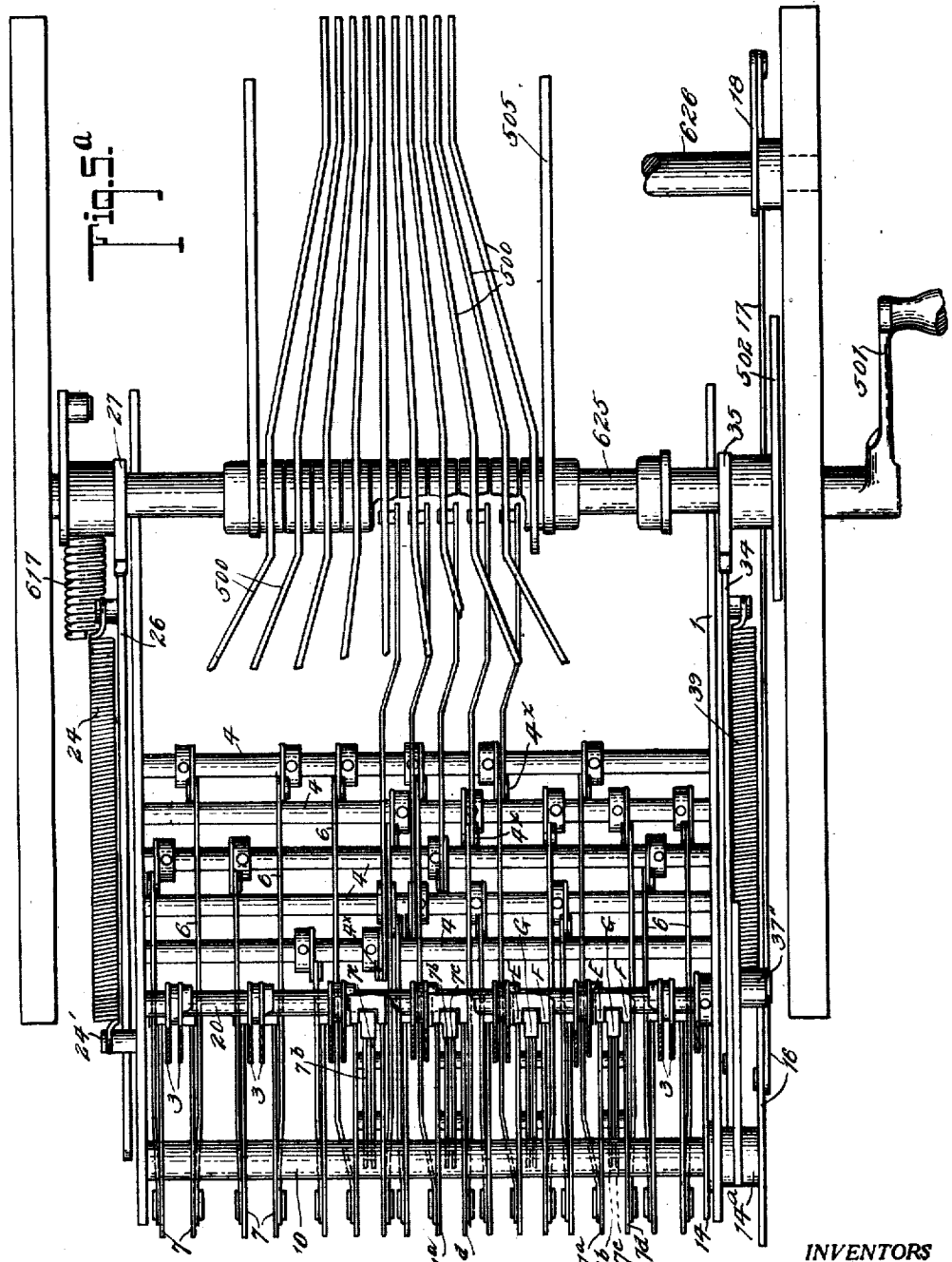

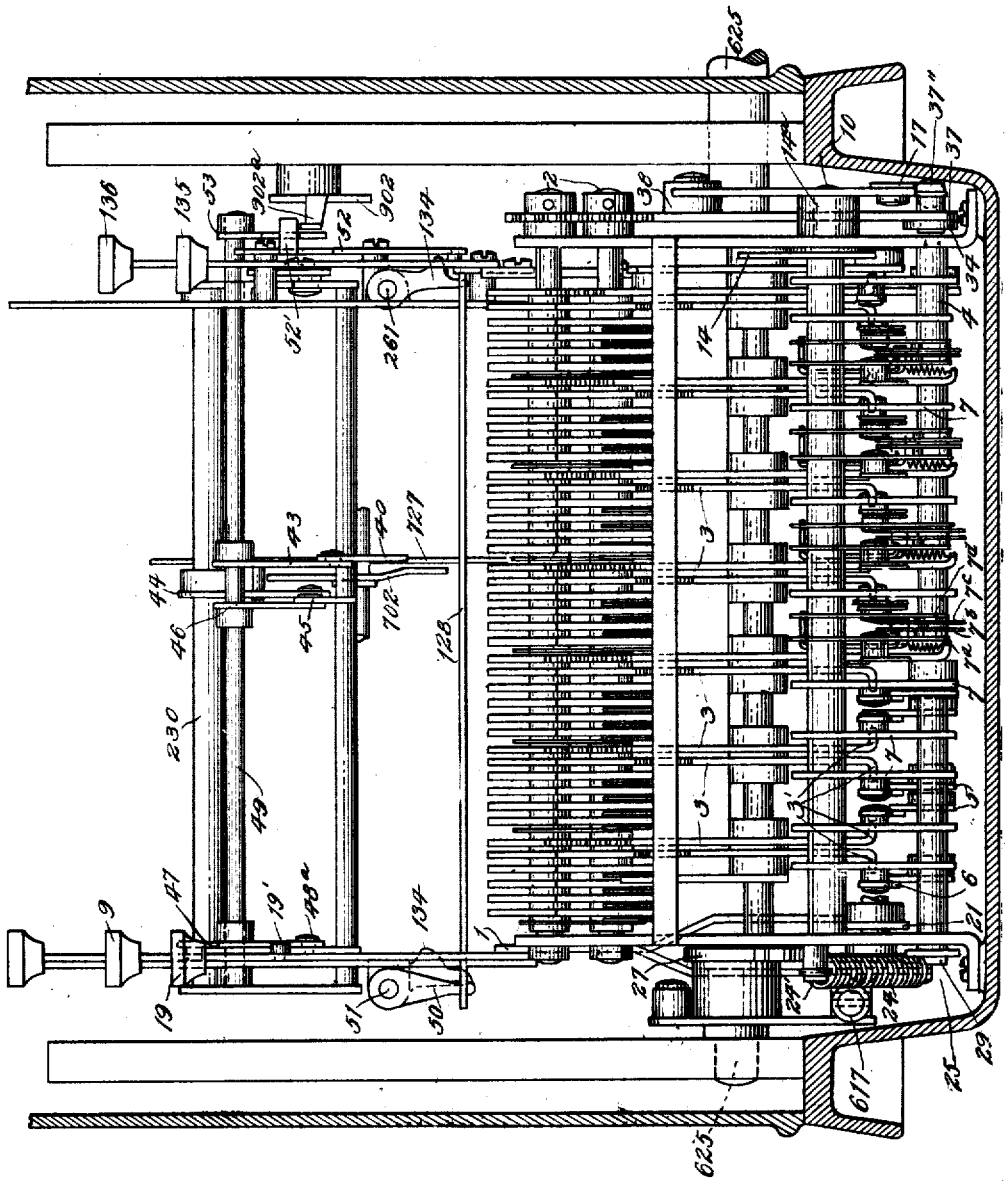

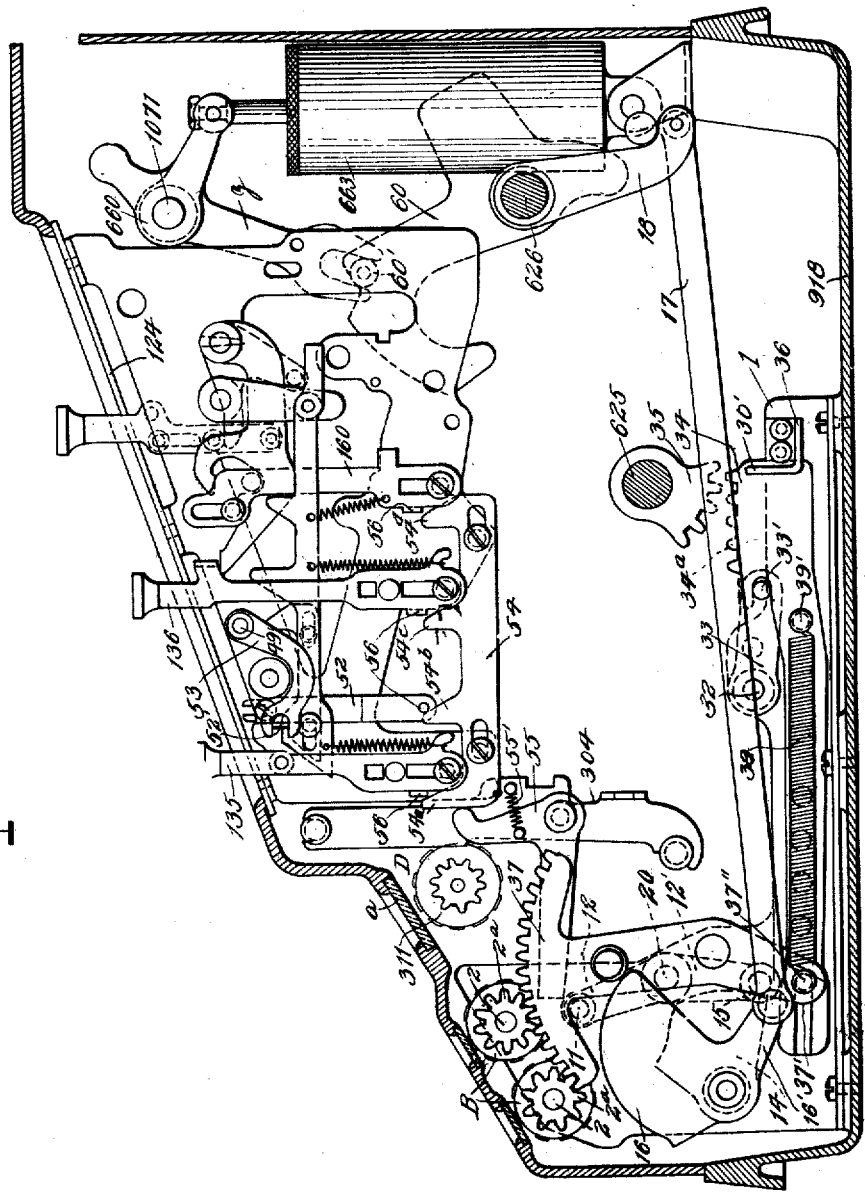

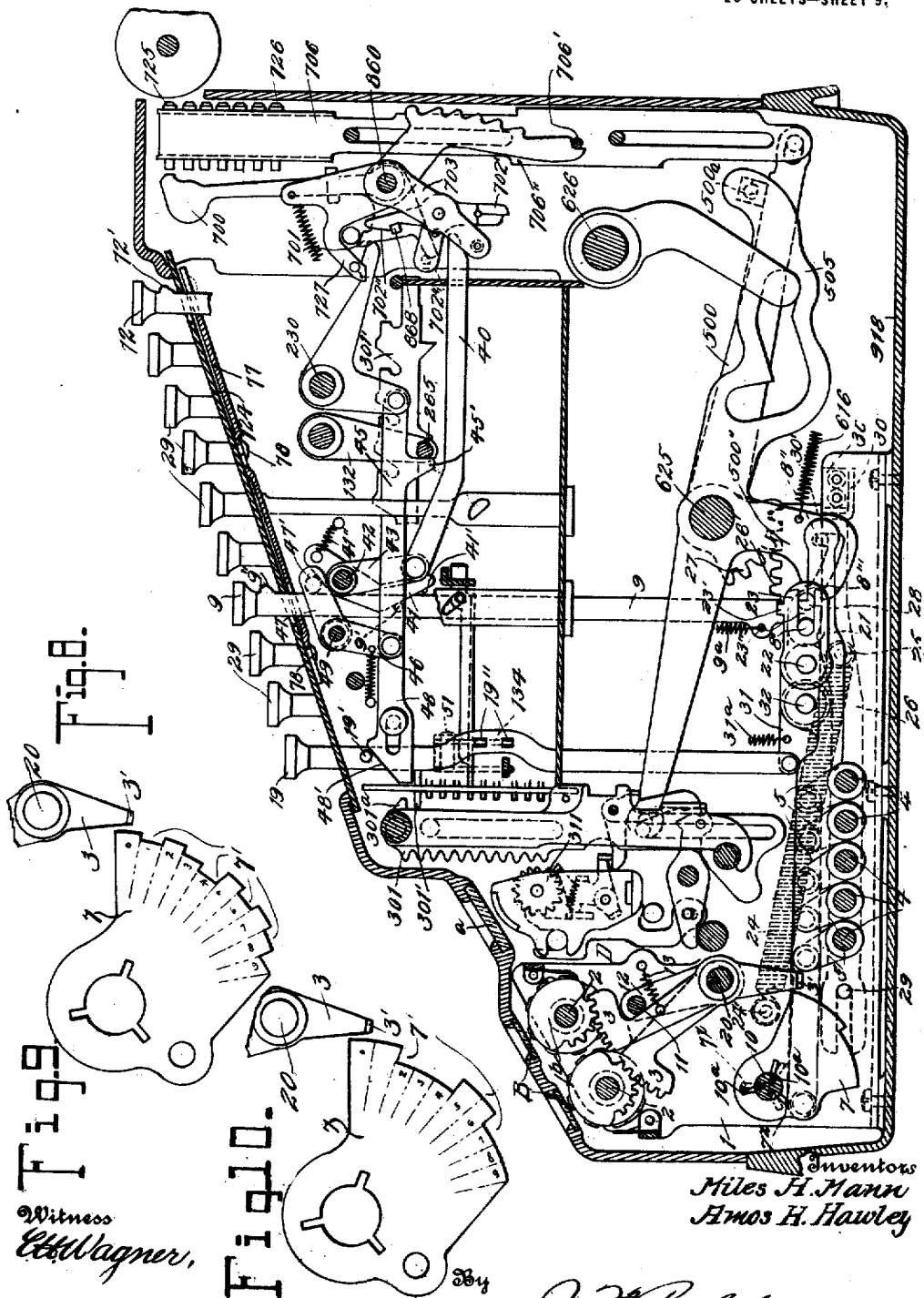

M. H. MANN & A. H. HAWLEY.
CALCULATING AND MONEY PAYING MACHINE.
APPLICATION FILED SEPT. 1, 1915.
1,298,751.
Patented Apr. 1, 1919.
20 SHEETS—SHEET 10.
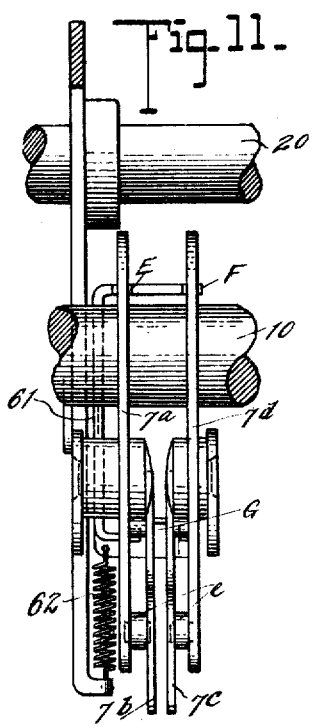
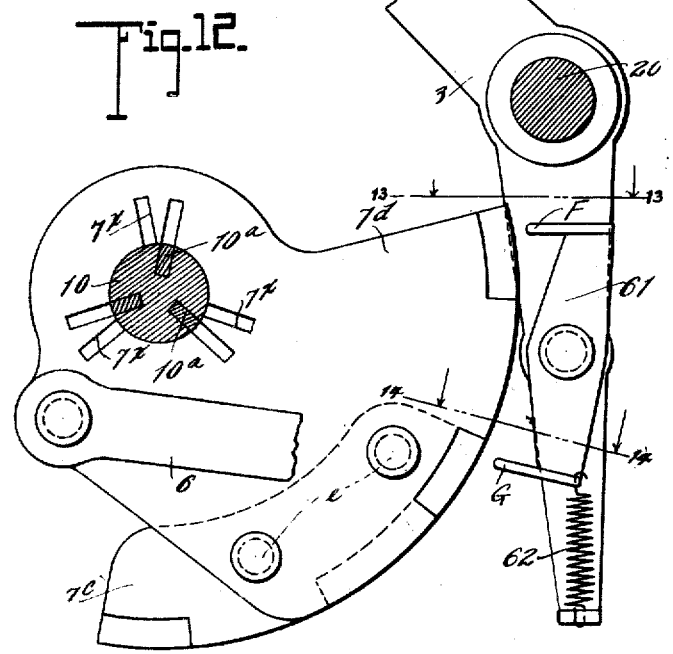
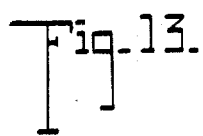
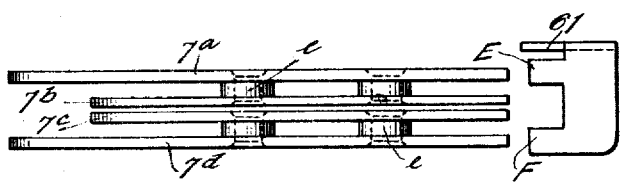
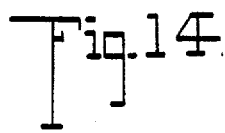
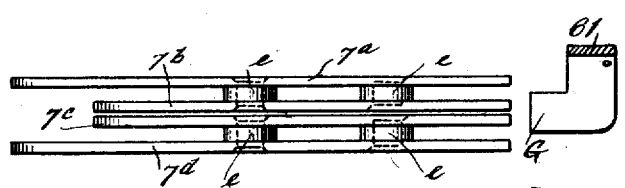

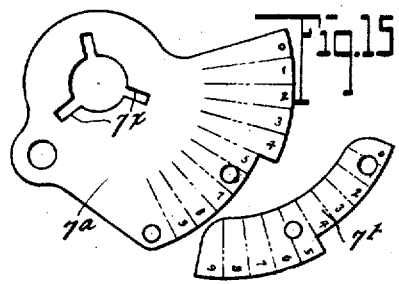
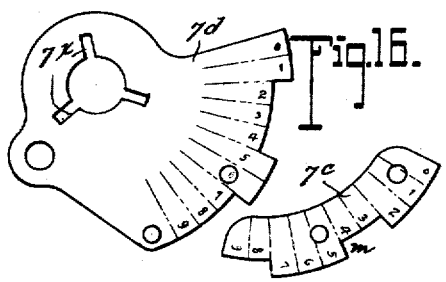
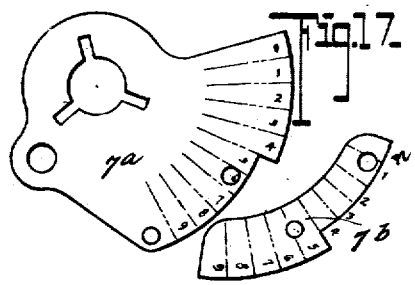
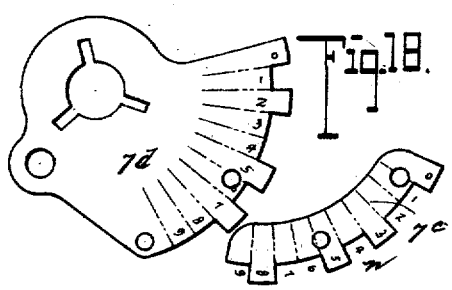
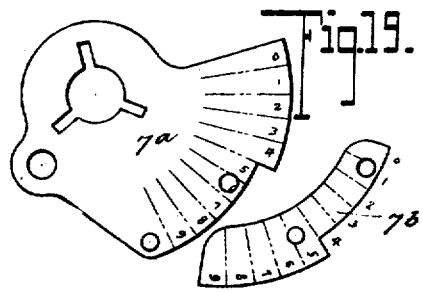
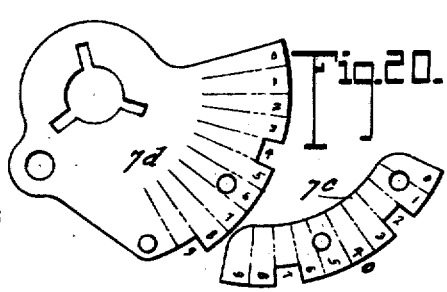

M. H. MANN & A. H. HAWLEY.
CALCULATING AND MONEY PAYING MACHINE.
APPLICATION FILED SEPT. 1, 1915.
1,298,751.
Patented Apr. 1, 1919.
20 SHEETS—SHEET 12.
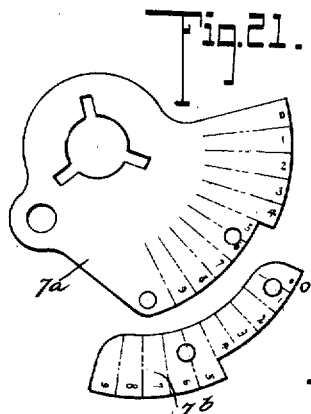
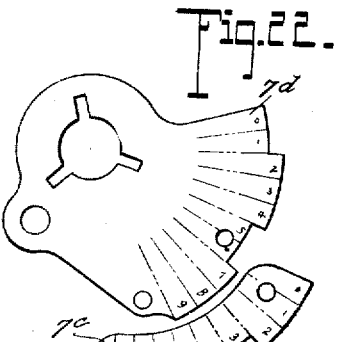
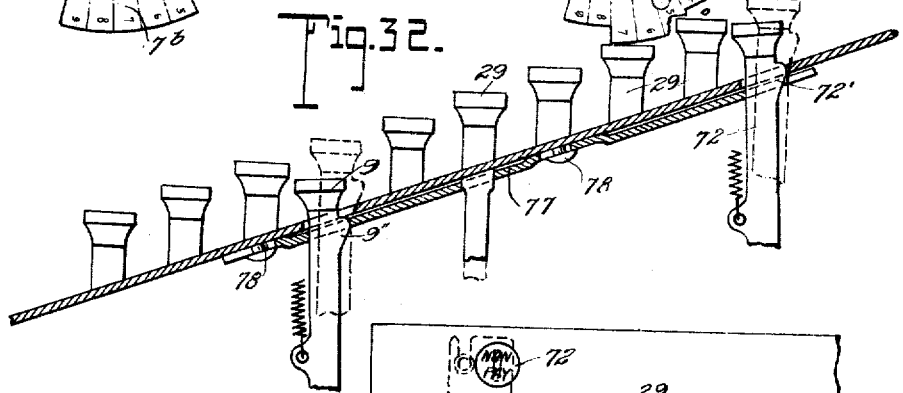
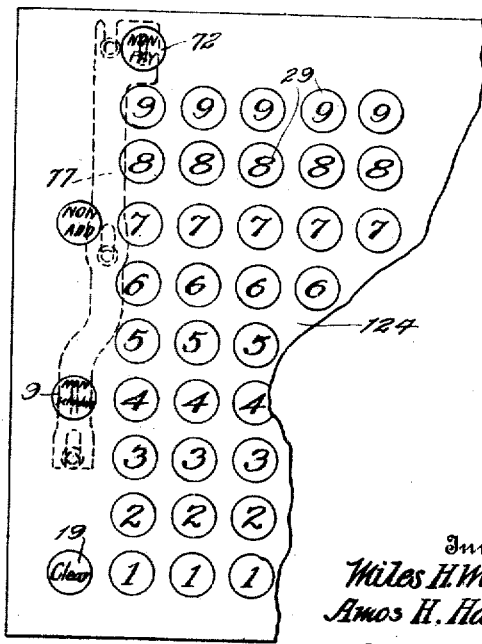

M. H. MANN & A. H. HAWLEY.
CALCULATING AND MONEY PAYING MACHINE.
APPLICATION FILED SEPT. 1, 1915.
1,298,751.
Patented Apr. 1, 1919.
20 SHEETS—SHEET 13.
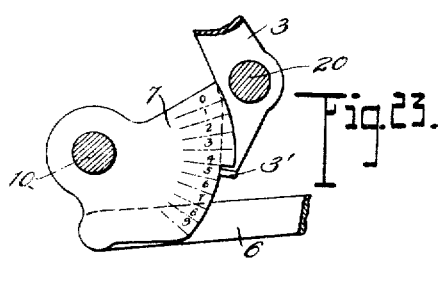
*50¢ Selection*
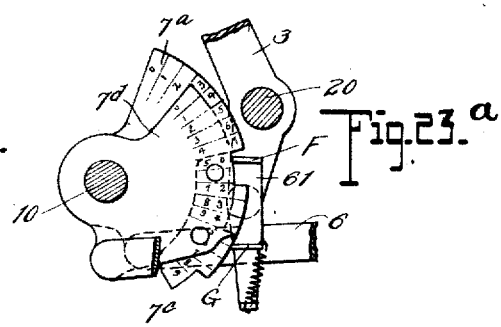
*5¢ Selection*
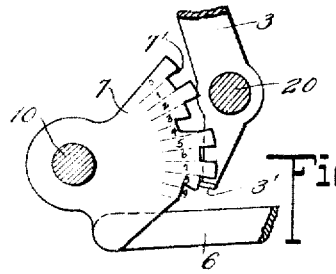
*1¢ Selection*
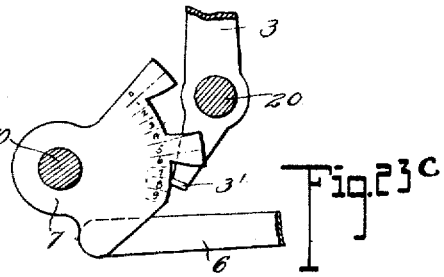
*2¢ Selection*
*Selections for Denominationalizing 58¢*
WITNESS
C. H. Wagner,
INVENTORS
Miles H. Mann
Amos H. Hawley
BY
ATTORNEY M. H. MANN & A. H. HAWLEY.
CALCULATING AND MONEY PAYING MACHINE.
APPLICATION FILED SEPT. 1, 1915.
1,298,751.
Patented Apr. 1, 1919.
20 SHEETS—SHEET 14.
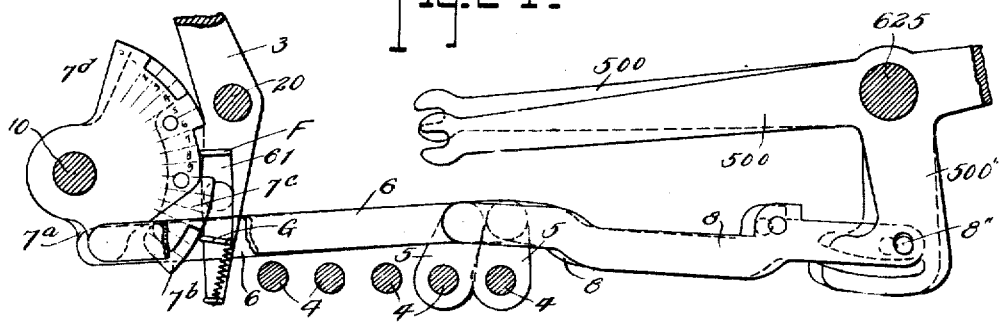
25¢ Selection
Fig. 24.
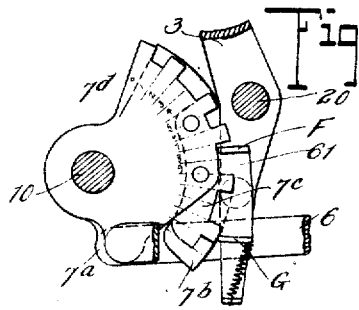
First 10¢ Selection
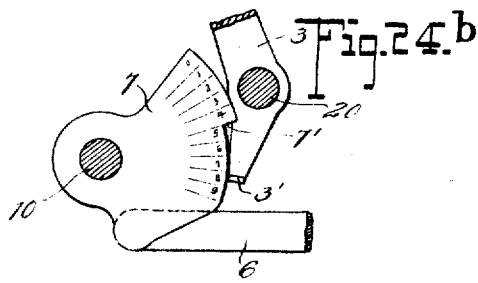
50¢ Selection
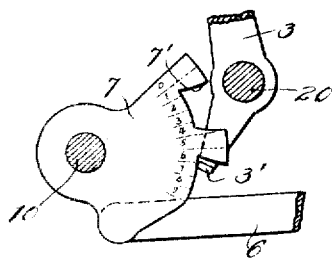
Selections for Denominationalizing 87¢
2¢ Selection
WITNESS
C. H. Wagner
INVENTORS
Miles H. Mann
Amos H. Hawley
BY
ATTORNEY

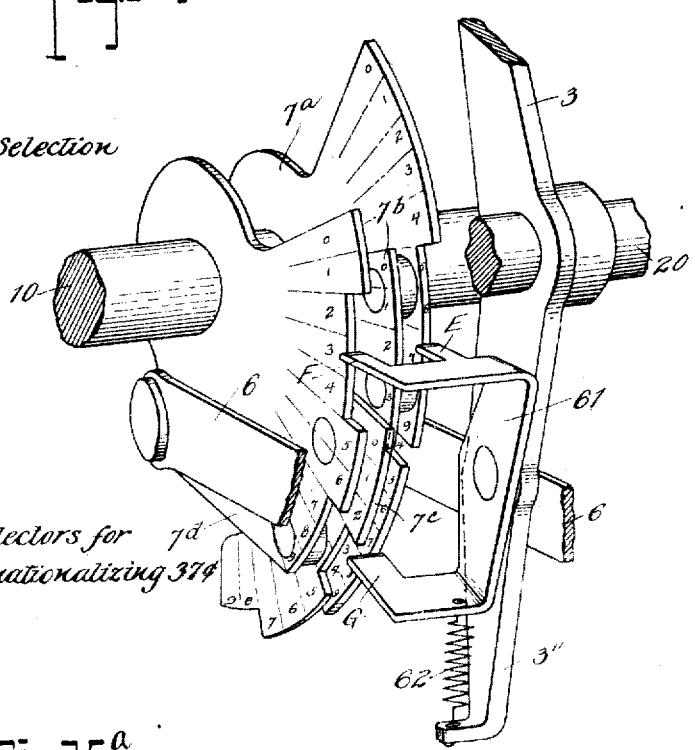
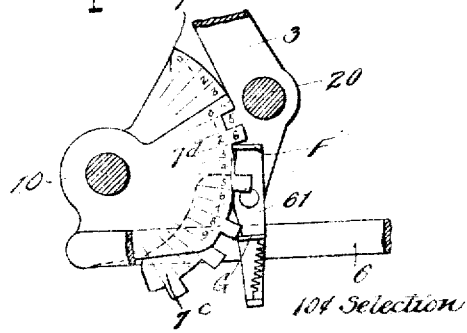
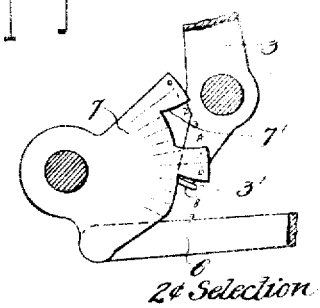

M. H. MANN & A. H. HAWLEY.
CALCULATING AND MONEY PAYING MACHINE.
APPLICATION FILED SEPT. 1, 1915.
1,298,751.
Patented Apr. 1, 1919.
20 SHEETS—SHEET 16.
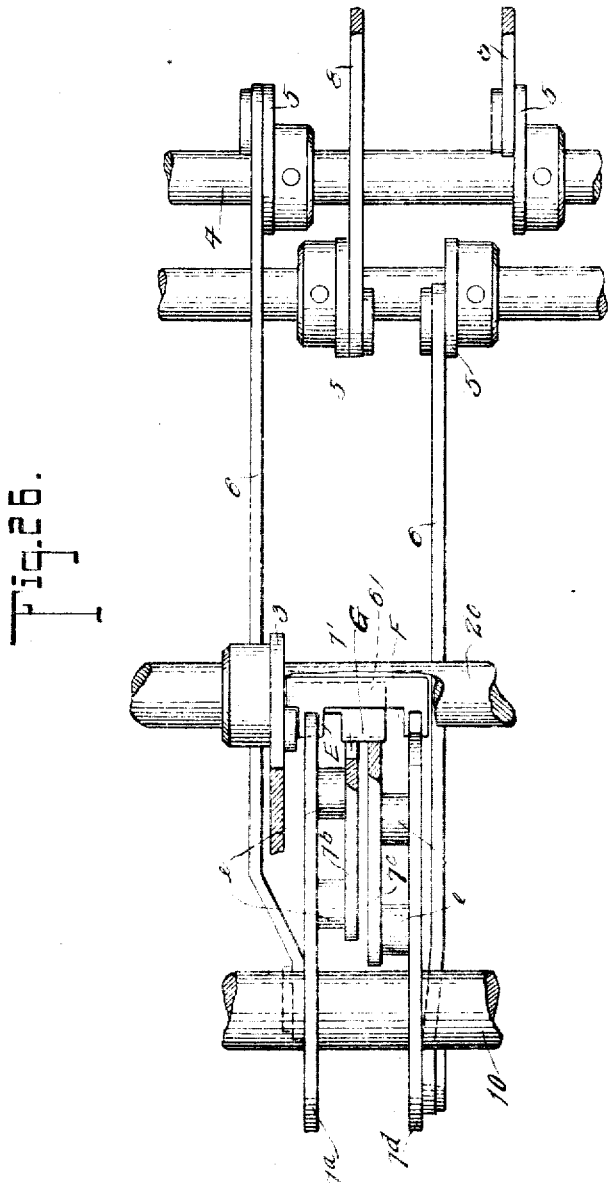
WITNESS
INVENTORS
M. H. Mann
A. H. Hawley
BY 
ATTORNEY M. H. MANN & A. H. HAWLEY.
CALCULATING AND MONEY PAYING MACHINE.
APPLICATION FILED SEPT. 1, 1915.

1,298,751.  Patented Apr. 1, 1919.
20 SHEETS—SHEET 17.

Inventors
Miles H. Mann
Amos H. Hawley

M. H. MANN & A. H. HAWLEY.
CALCULATING AND MONEY PAYING MACHINE.
APPLICATION FILED SEPT. 1, 1915.
1,298,751.
Patented Apr. 1, 1919.
20 SHEETS—SHEET 18.
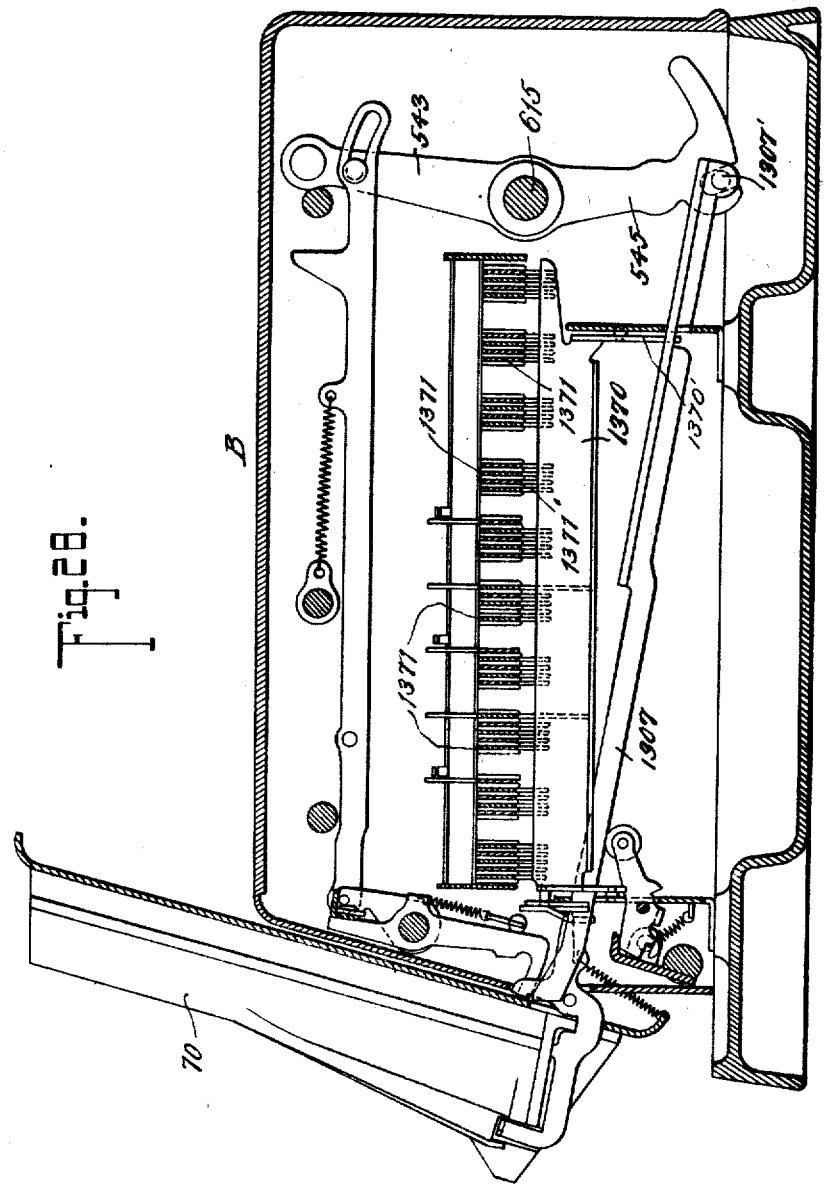

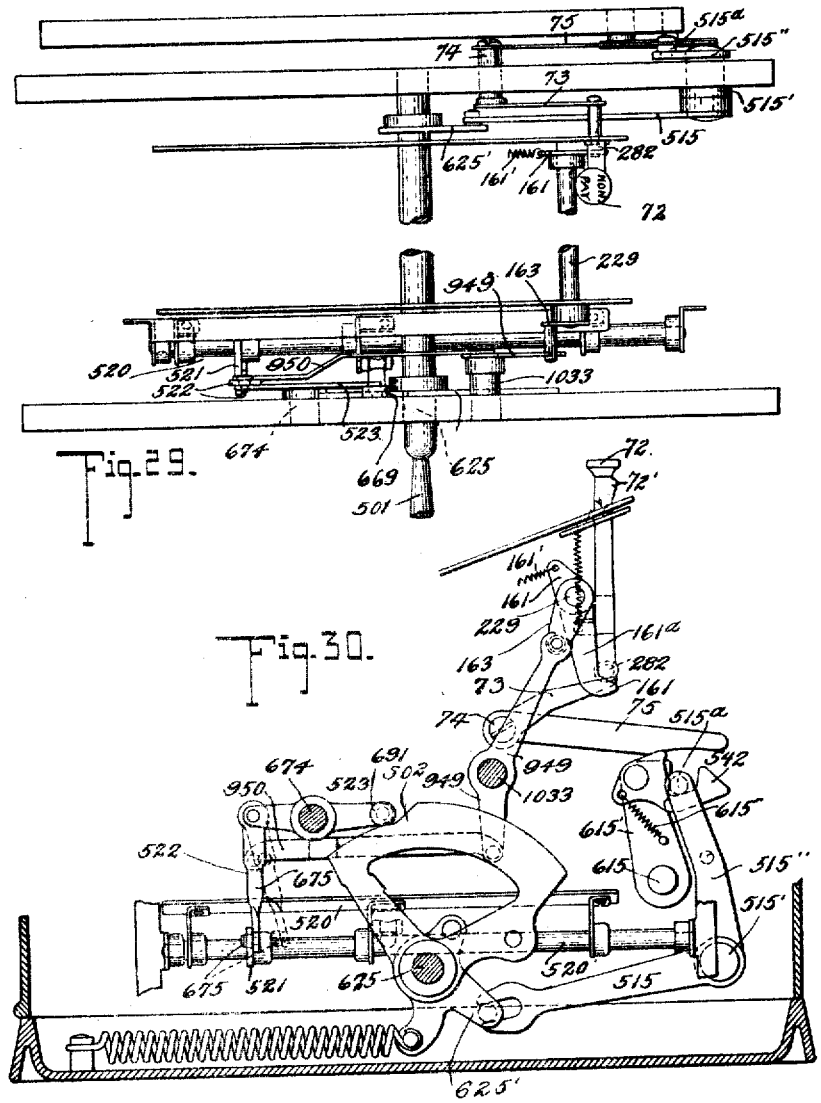

M. H. MANN & A. H. HAWLEY.
CALCULATING AND MONEY PAYING MACHINE.
APPLICATION FILED SEPT. 1, 1915.
1,298,751.
Patented Apr. 1, 1919.
20 SHEETS—SHEET 20.
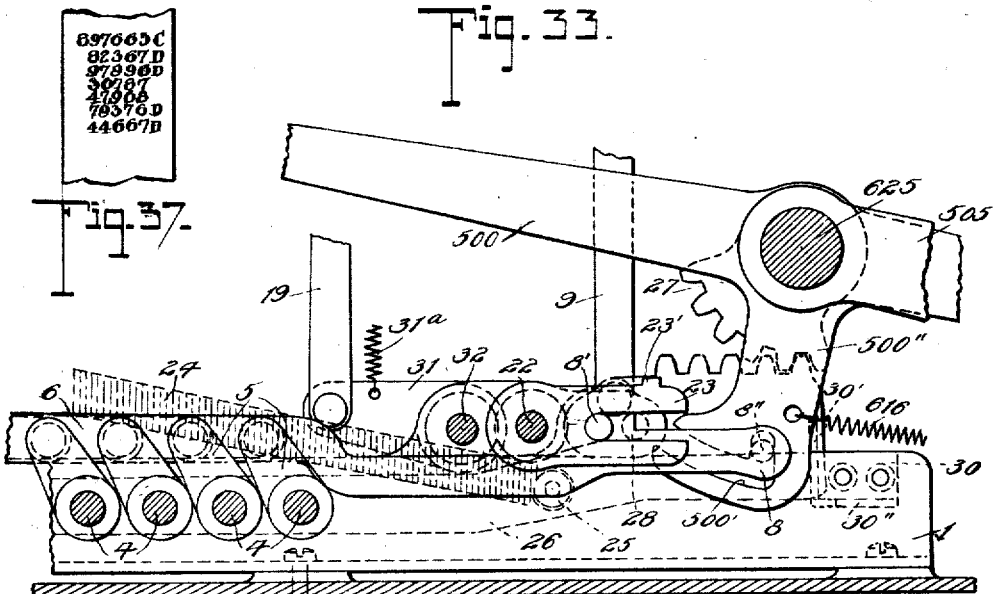

UNITED STATES PATENT OFFICE.

MILES H. MANN AND AMOS H. HAWLEY, OF TERRE HAUTE, INDIANA, ASSIGNORS, BY MESNE ASSIGNMENTS, TO INTERNATIONAL MONEY MACHINE COMPANY, OF TERRE HAUTE, INDIANA.

CALCULATING AND MONEY-PAYING MACHINE.

1,298,751. Specification of Letters Patent. Patented Apr. 1, 1919.

Application filed September 1, 1915. Serial No. 48,544.

*To all whom it may concern:*

Be it known that we, MILES H. MANN and AMOS H. HAWLEY, citizens of the United States, residing at Terre Haute, in the county of Vigo and State of Indiana, have invented certain new and useful Improvements in Calculating and Money-Paying Machines, of which the following is a specification.

The present invention has relation to the art of calculating, registering, listing, and money paying machines and embodies a unitary machine wherein are provided a number of different mechanisms not only adapted to operate in conjunction with one another but one or more of which may be adjusted to remain inactive so that the scope of operation and utility of the machine may be increased and decreased dependent upon the particular work required to be done.

As a combined machine this invention is primarily intended for use in making up payrolls in factories, stores, or other establishments where on account of the employment of large numbers of wage earners, the problems of computing, listing, paying out moneys, and otherwise keeping track of transactions or amount items appertaining to each employee, are especially complicated and involve arduous work. The present invention is not, therefore, limited to any particular combination of the coöperative mechanisms to be hereinafter set forth in detail, but involves broadly various combinations of such mechanisms as well as the peculiar constructions of the mechanisms themselves, considered in the light of independent complete mechanical organizations of parts.

In one of the phases thereof this invention involves an adding and listing machine in itself complete to perform all of the usual functions of such a machine, so organized in conjunction with certain calculating mechanism that the ordinary operation of said machine may cause the computation by the calculating means aforesaid, of the smallest number of pieces of money of different denominations according to a predetermined currency system, required to make up each item (wage transaction for instance) set up on the adding machine. The object of the denominationalizing feature is to facilitate the making up of payrolls, or performing any transaction of a similar nature, requiring the payment of different sums of money. The calculating mechanism by separating each sum set up, into denominations of currency needed to make up the same, enables an operator to obtain from a bank or source of supply the exact number of coins and pieces of paper currency required for the whole operation. The means just mentioned is hereinafter referred to as the "denominationalizer" or "denominationalizing mechanism" having in mind its particular functions above generally described.

Secondary to the foregoing it is contemplated to provide means whereby the coöperative action of the accounting (adding and listing) machine, and the denominationalizing calculating instrumentalities may be discontinued at will. Obviously the accounting machine would be useful under nearly all conditions, while the said associated mechanism is required at certain times only, hence the desirability of disestablishing the coöperation of the two in such a way as not to affect the normal uses or operation of the adding and listing machine.

In accounting machines of the adding and listing type provision is made for clearing the accumulator, this being done usually as an incident to taking a grand total. Again, means to sub-total transactions, and to list certain items without accumulating or adding the same, are employed in the accounting machine forming a part of this invention. With a view, therefore, to establishing even greater interdependence between the accounting and denominationalizing means by reducing to a minimum the controlling operations, suitable intermediate devices are utilized, whereby the accumulating and denominationalizing mechanisms may be simultaneously cleared when working coöperatively, and to provide against operation of the latter mechanism when listing transactions not to be added, and during the taking of totals and sub-totals.

Another object of this invention is to so govern the accounting machine devices by means of the denominationalizer control mechanism as to indicate all items actually denominationalized. While this is done by characterizing such items as they are listed, the invention is not to be limited to this method alone.

Still another and very important object of the present invention has been to produce a novel denominationalizing mechanism *per se*, one which while advantageously employed in conjunction with an adding and listing machine, is susceptible of use as a complete operative mechanical organization to perform its own peculiar functions. Under such conditions, the denominationalizer is simplified greatly, as compared with the combined machine, aside from its restricted field of usefulness.

The machine of this invention is furthermore adapted to comprise money paying instrumentalities under the control of the accounting machine controlling and operating means, and when so designed, by the provision of means to disable the paying out of money, the denominationalizer is capable of determining the number of pieces of money of different denominations to be supplied to the money magazine of the paying mechanism, the latter as well as the denominationalizer being under the control of the manipulative keyboard devices, and the prime mover of the accounting machine. Co-pending applications of White et al., Serial Number 702,164, filed June 7, 1912; Robert T. Brockman, Serial Number 4893 filed January 28, 1915; and Letters Patent of Gustaf Runquist, 1,213,268, issued Jan. 23, 1917, show accounting and money paying features in detail and combination such as are contemplated to be used in the carrying out of the present invention, but which are neither illustrated nor described in such detail in view of the consideration that the specific character of these features forms no special part of this invention other than as hereinbefore suggested.

A feature of importance embodied in the machine of this invention is the provision of peculiar energy storing means for the operation of the denominationalizing mechanism combinatively associated with the accounting machine whereby the extra load on the main actuator of the accounting machine incident to combined operations, is accommodated. The said energy storing means is characterized especially in that it is so designed that when the denominationalizing mechanism is not used in conjunction with the accounting machine instrumentalities said energy storing means is rendered inactive and does not affect in any way the normal operation of the accounting machine and the energy storing mechanism that is necessarily provided for the latter. On the other hand, when through the operation of a controlling manipulative member the denominationalizing devices proper are adjusted to be controlled from the accounting machine instrumentalities the denominationalizing energy storing means above referred to is thrown into action in an advantageous manner.

This invention also resides in divers other specific features of construction and combination of parts all of which will be more fully set forth hereinafter, and in the accompanying drawings wherein:—

Fig. 2 is a vertical sectional view showing the general arrangement of the keyboard, accumulating, and printing mechanisms.

Fig. 3 is a vertical sectional view bringing out more clearly the control devices intermediate the main actuator and the accumulating and printing mechanisms and the special keys.

Fig. 4 is a plan view showing particularly the keyboard section of the machine alone and the locking and releasing devices for the keys, certain parts being omitted to avoid complicacy of illustration.

Fig. 5 is a view looking down upon the denominationalizing mechanism and bringing out the arrangement and connections intermediate said mechanism and the differentially operating levers which actuate the adding racks and type carriers, the latter parts being omitted along with the mechanism associated with each of them.

Fig. 5ª is a top plan view like Fig. 5 with the denominationalizing registering wheels omitted, however.

Fig. 6 is a front view of the machine with the casing removed and intended to illustrate fully the parts shown in Fig. 5.

Fig. 7 is a vertical sectional view taken about on the line 7—7 of Fig. 5 showing the controlling means and the means to prevent operation of the denominational registers when listing an eliminated item or adding a sub-total.

Fig. 8 is a vertical sectional view taken about on the line 8—8 of Fig. 5.

Figs. 9 and 10 are detail views illustrating particularly the selectors for denominationalizing a single and double coin selection and a double coin selection only, respectively.

Figs. 11 and 12 are front and side views respectively of one of the combination order selecting devices.

Figs. 13 and 14 are sectional views taken on the lines 13—13 and 14—14 respectively of Fig. 12.

Figs. 15 and 16 are detail views of the twenty-five cent combination selector means with the main and auxiliary selectors detached from one another and having the increment of movement positions diagrammatically illustrated by numeral indicia.

Figs. 17 and 18, 19 and 20, and 21 and 22, are views similar to Figs. 15 and 16 but showing respectively the first ten cent combination selector means, the second ten cent combination selector means, and the five cent or nickel combination selector means.

Figs. 23, 23ª, 23ᵇ, and 23ᶜ are fragmentary sectional detail views showing various combination and single selectors adjusted to the positions assumed thereby for denominationalizing the amount of fifty-eight cents.

Figs. 24, 24ª, 24ᵇ, and 24ᶜ are views similar to those last referred to, illustrating, however, the selectors adjusted for the denominationalizing of the amount of eighty-seven cents.

Fig. 25 is a perspective view, parts broken away; and Figs. 25ª and 25ᵇ are sectional details in elevation of the selectors adjusted when it is required to denominationalize an amount of thirty-seven cents.

Fig. 26 is a front view, parts broken away, and at points illustrated in section, showing more clearly the arrangement of the parts as illustrated in Fig. 25.

Figure 27:
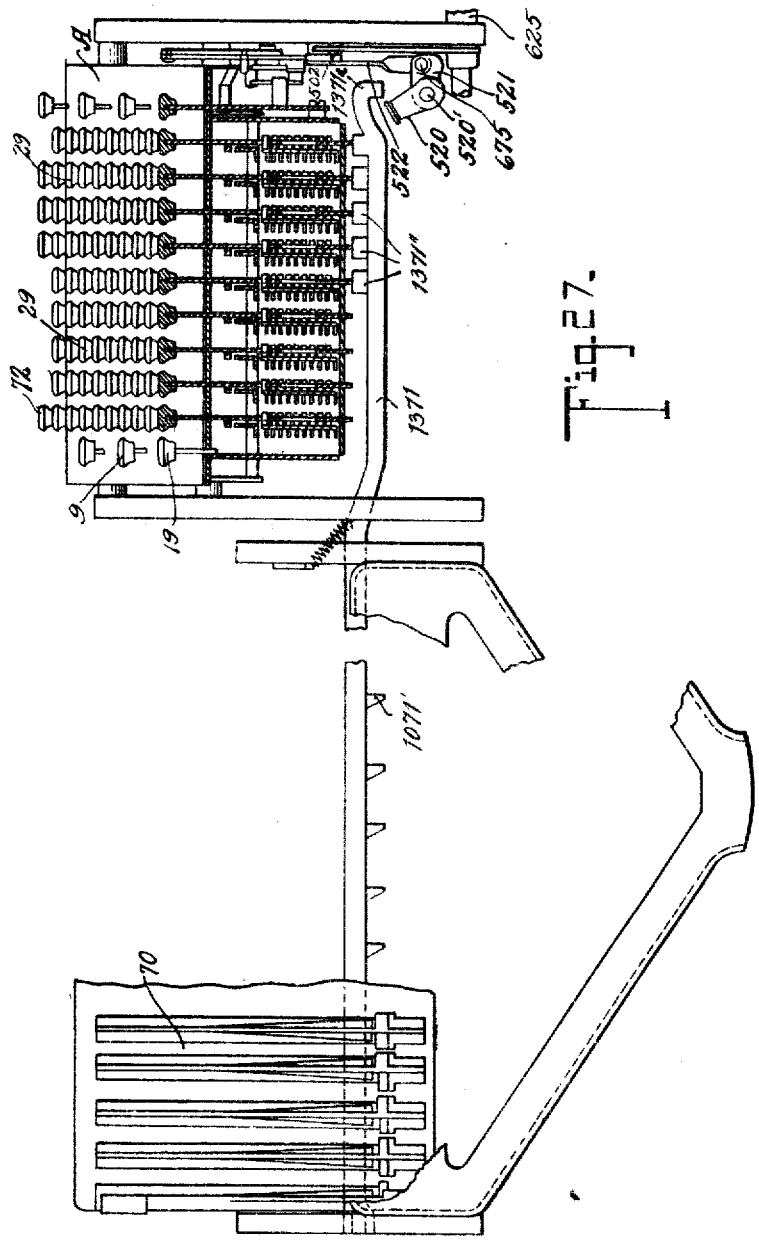

Fig. 27 is a front view, partly in section and partly broken away, showing more fully the selecting mechanism intermediate the keyboard devices and the paying out mechanism or money section of the machine.

Fig. 28 is a sectional view through the paying out section of the machine clearly illustrating the ejecting and money selecting instrumentalities.

Figs. 29 and 30 are plan and elevation views, respectively, of the disabling devices controlling the action of the money paying mechanism.

Fig. 31 is a fragmentary plan view of a portion of the keyboard bringing out more clearly the controlling device intermediate the disabling keys for the paying mechanism and denominationalizing mechanism.

Fig. 32 is a fragmentary sectional view showing more clearly the feature illustrated in Fig. 31.

Fig. 33 is a fragmentary view showing detail mechanism of Fig. 8 much enlarged.

Figs. 34 to 36 are detail views of the denominationalizing registers showing more clearly the actuating means and transfer mechanism of the same.

Fig. 37 is a view of a portion of the record strip with characterized items thereon.

The accounting machine.

Figure 1:
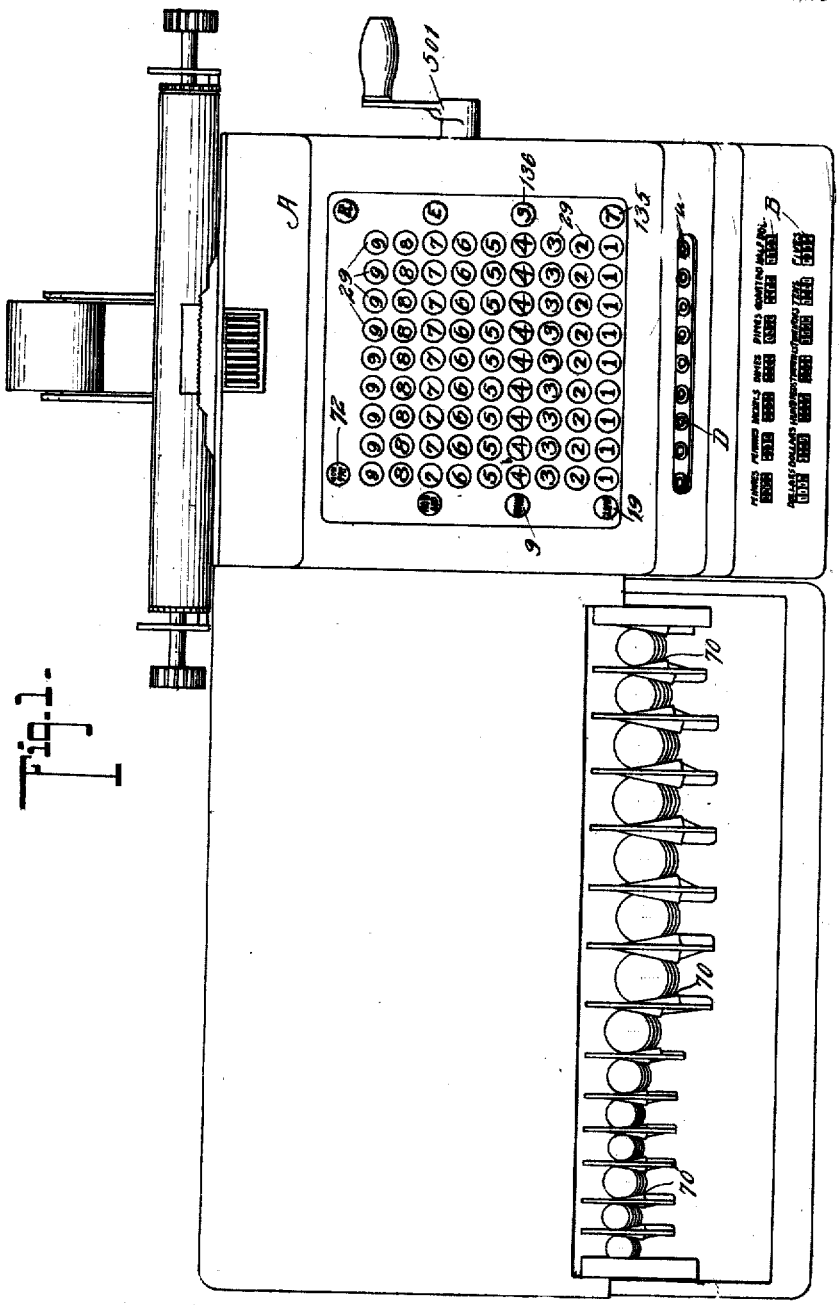
Figure 1 is a top plan view showing in a general manner with certain parts out of view an accounting machine of the adding and listing type, embodying the present invention.

The accounting machine A, shown in Figs. 1 to 4 inclusive particularly, is an ordinary adding and listing machine operating similarly in respect to principle to machines of a well known type. The machine comprises a main actuator in the form of a handle 501 connected with the main shaft 625, see Fig. 7. The machine comprises the usual keyboard embodying a suitable number of rows of amount keys 29. The accumulator is located at the front of the machine so that registrations thereof may be observed through the openings $a$. The keys 29 control the indexing mechanism for the accumulating and printing instrumentalities. There may be provided as shown in Fig. 1 certain special keys including a repeat key indicated by "R," the error key indicated by "E," a sub-total key indicated by "S" and designated 136, and a total key indicated by "T" and designated 135. If the accounting machine is to be used in connection with an associated paying machine or mechanism a non-pay key 72 will be employed to control the operative connection between the accounting and paying machines so that the two may be coöperatively actuated as a single machine, or disconnected for independent operation as desired.

As seen best in Fig. 3, the accumulator D embodies the usual adding wheels 311, the pinions of which are engageable by the adding racks 301, the movement of the latter being effected by operating levers 500 connected at their front ends with the adding racks, one for each rack, and at their rear ends each connected with a type carrier 723. A spring 616 is connected with an arm 500″ projecting downward from the central portion of each lever 500 and normally tends to draw the front end of the lever downward and raise its rear end. Such movement of the lever 500 is restrained, however, by a detent bar 500ª contacting with the rear upper edge portions of the several levers and carried by a pair of arms 505 having crooked slots formed therein.

The racks 301 and the type carriers 723 are adapted for differential movement under the control of the indexing mechanism directly actuated by the keys 29 which will shortly be described. It may be noted, however, that on each actuation of the handle 501 correspondingly turning the shaft 625, a cam 502 on said shaft is moved and through the flexible connection 40ª between said cam and the lever 508, a shaft 626 to which said lever 508 is secured, will be partially rotated. The shaft 626 has downwardly extending rigid arms 626ª that are formed with studs entering the crooked slots of the arms 505 and the operative connection established by the parts just mentioned is adapted to cause upward movement of the detent bar 500ª to release the levers 500 and permit these levers to move in the event they have been released by certain coöperative keys 29 and indexing members controlled thereby, the degree of movement being regulated in the manner well known in this art by the said indexing devices.

The indexing mechanism.

The adding racks 301 are normally locked against movement by coacting locking bars 301' (see Fig. 2), one bar being provided for each row of keys 29 and each key 29 having a pin 29' to engage a cam on the bar 301' whereby to force said bar rearward on the depression of any key of each row. Such rearward movement of the bar 301' disengages the front end of said bar from a projection 301ª on the adding rack. A series of indexing members in the form of sliding plates 126 is provided for each row of keys, each plate having a lateral pin 126' engaging in a slot 29'' of an associated key 29 so that by depressing the key a forward movement will be imparted to its connected indexing member projecting such member at its front end into the path of movement of the projection 301ª so that under such condition the indexing member will control the extent of movement of the adding rack 301 and correspondingly control the accumulation effected on the associated adding wheel 311. If the key designated 8 of a row is depressed its indexing member 126 will be projected so that the rack 301 will have eight increments of movement as against four increments of movement if it were controlled by the operation of the key designated 4 of the same row. In a manner similar to the controlling of the movement of the adding racks 301 actuated through the movement of the levers 500, the movement of the type carriers 723 is controlled, each type carrier having the same degree of movement as permitted on the part of its connected adding rack.

It is not believed necessary to describe in detail the accumulator, or the printing devices employed, the former embodying suitable transfer mechanism and being controlled by means to be hereinafter described a little more fully, and the latter including the type hammers 723ª which act on the type members 723' supported by the type carriers 723, in a manner well known in this art, namely by way of impingement.

When the indexing members 126 are actuated by their respective keys, each actuated member is locked in the position to which it is moved by the key, by a locking plate 127 one of which is provided for each vertical series of said indexing members 126 (see Fig. 4). Each locking plate 127 coöperates with lugs 126ª offstanding from the side edges of the indexing members, at their front ends. A release plate 128 is mounted on the frame carrying the indexing and keyboard devices and has projections engaging the various vertically disposed locking plates 127 which are spring-actuated to engage the members 126. Said release plate 128 is operated from the handle 501 of the machine to release the members 126 and the keys 29 after a transaction of the machine, and also to release these keys as an incident to the operation of the total, sub-total, clearing and error special keys.

Control means for accumulating and printing mechanism.

The accumulator D (see Fig. 3) is carried by a shaft 482 and is shiftable as customary to engage its adding pinions with the racks 301 by means of the rod 327 connected with the three-armed control lever 316. The lever 316 is adapted to be rocked differentially, so to speak, to cause the adding pinions of the wheels 311 to become meshed with the teeth of the racks 301 at different times, in respect to the excursions of the racks, to cause regular accumulation of items by the wheels 311 and to control the taking of totals and sub-totals when the keys 135 and 136 are operated respectively, the general coaction of the parts 301 and 311 being the same as in ordinary adding, totaling and sub-totaling machines in the art. The movement of the lever 316 is effected through the medium of the operating lever 508 before mentioned, the same having a roller 652 and a wipe pawl 511. In its movement with the lever 508 the pawl 511 is adapted to engage pins 469 on opposite arms of the lever 316, under the control of a main total lever 902, and an auxiliary total lever 901 and also under the control of a sub-total lever 903. The detail operation of the total and sub-total keys is immaterial to the present invention since any conventional type of operating instrumentalities of this kind may be employed within the purview of the invention.

As seen in Fig. 3, the total key 135 controls the coöperation of the wipe pawl 511 with pins 469 on the lever 316, through the provision of the stud 135' on the key 135 coöperative with the total lever 902 which in turn coöperates with the sub-total lever 903, the total lever 902 being composed of two sections including the section 901 which has a lug 901' disposed beneath the main lever section. The sub-total key 136 has a stud engageable with the lever 903 and the parts of the lever 902 are mounted on the shaft 1081. The accumulator coacts with the adding racks 301 on the up-stroke of the latter for ordinary adding, on the down-stroke of the latter for taking of a grand total and clearing the register, and on both the up and down strokes of the racks, in the taking of sub-totals, and eliminated items.

As the handle shaft 625 is moved the movement is transmitted through the cam 502 and connection 40ª to the lever 508. The raising of the arms 505 relieves the levers 500 of the downward pressure of the detent bar 500ª and the levers 500 rock differentially and cause corresponding movement of the adding racks 301 downward and the type carriers 723 upward.

Special type carrier.

As seen best in Fig. 8, there is provided the special type carrier 706 having the characterizing types 726. The only ones of these types with which we are concerned particularly are the uppermost and lowermost, the former being the characterization type "D" and the lower the characterization type "C." The type "D" is to characterize denominationalized items set up in the machine in a manner hereinafter more fully described, and the type "C" is to characterize a cleared condition of the accumulator and the denominationalizing mechanism. The manner in which the movement of the special type carrier 706 is controlled is similar to that afforded by certain means fully presented in the application of Sorum and Brockman, Serial Number 854,836 filed Aug. 3, 1914, especially in regard to the characterization of certain operations of the machine. Such means, however, has been required to be modified having in view new conditions of operation presented by the improvements representing this invention. For present purposes it may be noted that an indexing sector 727 is mounted on the shaft 860 and is notched so that its notches may be engaged by a stud 706' on the type carrier 706. The adjustment of the sector 727 of course is effective to limit the movement of the type carrier 706 whereby the latter may be positioned so that its characterizing types 726 are opposite the printing point. A special type hammer 700 is coöperative with the types of the carrier 706 and the manner in which the type carrier 706 is employed for the purposes of this invention will appear more fully hereinafter upon the description of certain controlling instrumentalities not yet presented.

Denominationalizing mechanism.

As shown best in Figs. 1, 7 and 8, the denominational registering mechanism is located in a forward extension of the casing inclosing the mechanism of the accounting machine, the registers themselves being in advance of the accumulator registering wheels 311. There are provided fourteen of the denominational registers B, said registers being arranged in two rows of seven each, and each register consisting preferably of four registering wheels of units, tens, hundreds and thousands order, as usual in registers of this sort. There is provided also any conventional transfer mechanism intermediate the wheels of each register B, and each register is designed to register units representing the number of pieces of money of a particular denomination that may be accumulated on such register.

The registers B are supported by shafts 2 mounted in a denominationalizer frame consisting of the side plates 1 (see Fig. 6). There are provided two registers for pennies, one for nickels, two for dimes, one for quarters, one for half-dollars, two for dollars, one for hundreds, two for twenties, one for tens, and one for fives. In the case of the pennies, dollars and twenty dollar registers, it is to be borne in mind that one of each is required to register therein one or two units, and the other to register two units only at a time. While the present machine is constructed in a combination structure representing coöperative denominationalizing, paying, registering, and listing mechanisms, it is within the purview of the invention to entirely dispense with the accumulator, the listing mechanism, or the paying mechanism, or all of them. In the latter event a denominationalizing machine alone would be had, as may be desired in accordance with the particular scope of use for which a machine may be especially designed. The base 918 of the machine carries the various mechanisms including those above described and that for denominationalizing, these mechanisms or parts thereof being assembled in sections or divisions. Arranged approximately beneath the accumulator are the parallel selector shafts 4, one of which is provided for each numerical order of the keyboard, or in other words, for each row of keys 29. Through the provision of mechanism intermediate the keys and the denominational registers B it becomes the function of the shafts 4 to distribute to the proper registers the number of units which are to be accumulated thereon. The particular registers that are to be affected by the operation of a particular selector shaft 4 are of course empirically determined. Pinned to the shafts 4 are cranks 5 connected by links 6 with selectors 7, the latter being in the form of sectors the curved edges of which are notched for the purposes of establishing the desired selective action (see Figs. 8, 9 and 10.)

Reference has been previously made to certain arms 500" projecting from the levers 500 which, it will be remembered, are susceptible of differential movement under the control of the indexing members or stops 126 and the corresponding keys 29. It is this differential motion of the levers 500, communicated to the shafts 4, which determines the positioning of the selectors 6 in such a manner that register actuating members coöperative with the selectors are operated to control one or more increments of movement of said registers in the denominational selecting action of the machine.

Differential motion is communicated from the arms 500″ to the shafts 4 through the provision of links 8, one of which is used to connect each arm 500″ with the shaft 4 that corresponds to the numerical order of keys 29 that controls the lever 5 having the particular arm 500″. At one end each link 8 is connected with an arm 4×, the other end of each link having a lateral stud 8″ which enters an L-shaped slot 500′ in the coöperating arm 500″. Intermediate its ends each link 8 has a second stud 8′ projecting laterally into a slot 23″ on an adjacent arm 23 carried by a shaft 22. The shaft 22 is supplied with the same number of arms 23 as there are links 8 and shafts 4, and the arms 23 have the projections 23′ at their rear uppermost end portions for a purpose to be hereafter described.

A disabling key 9 is mounted in the frame of the keyboard section of the machine and is pressed upward by a spring 9ª and is connected at its lower end to an arm 21 extending from the shaft 22 at the left hand end of the same, looking toward the machine from the front. The arm 21 being rigid with the shaft 22 is adapted to be depressed by the denominationalizer disabling key 9, thereby depressing correspondingly the various arms 23 and the links 8 that are interlocked with said arms. This causes the studs 8″ at the rear ends of the links 8 to move downward into the curved portions of the slots 500′ of the arms 500″ and when the parts 8″ are thus positioned movement will not be imparted to the links 8 as an incident to the movement of the levers 500 and arms 500″. In other words, to establish an operative connection between the main actuating mechanism of the accounting machine, or more specifically speaking, between the levers 500 and the denominationalizing mechanism, it is necessary that the key 9 be in its uppermost position with the studs 8″ interlocked with the arms 500″ by reason of the engagement in the shorter or vertical portions of the slots 500′. When in such position, rearward movement of the arms 500″ imparts the required movement to the links 8 and shafts 4 and the connected reflectors 7. The operative relation between the parts 500″ and the links 8 is established and disestablished by the key 9 which has a catch 9″ engageable with the keyboard plate 124 whereby to hold the key in a depressed or disabling position.

It will be obvious that the interlocking of the studs 8″ with the arms 500″ will be impossible except when the levers 500 are in their normal or zero positions, owing to the peculiar location of the short portions of the slots 500′. When the arms 23 are rocked downward, by depressing key 9, the projections 23′ of the arms 23 are moved into interference paths in rear of the shoulders 8‴ of the links 8 correspondingly depressed, thereby effectively locking the links 8 against unauthorized rearward movement.

The selector members or sectors 7 are loosely mounted upon the shaft 10 and their graduated or differential adjustments are effected by motion communicated through the links 6 previously referred to. The said selectors 7 are formed with the notched or cut-away portions 7′ adapted to receive a projection 3′ at the lower end of a register actuating lever 3, the entrance of said projection into the notched or cut-away portion 7′ permitting sufficient movement of the lever 3 whereby to actuate the corresponding register B, one of which is operated by each lever 3, and thus the register will be moved to set up the predetermined unit or units. In the case of selectors such as shown in Figs. 9 and 10, the notches in the selectors may be of single or double depth so as to control a single or double increment of movement on the part of the associated register actuating lever 3. In this way a single movement may be imparted to register up a penny transaction on the penny register incident to coöperation of the projection 3′ with a shallow notch and two pennies may be correspondingly registered incident to coöperation of the projection 3′ with a notch of double depth. This also applies, of course, to the registration of one and two dollars as well as one and two cents. The selector in Fig. 10 is provided only with double depth notches and is typical of the construction adapted to control the registration of two dollar items or two cents, or forty dollars, the last represented by two twenty-dollar gold pieces or bills, as the case may be.

The connection between the register operating levers 3 and the registers B is established by providing on the upper end of each lever a toothed rack engaging with the teeth of a disk $b$ associated with the units wheel of each register and loose on the shaft 2. The single or double movement imparted to the disk $b$ is communicated to the units wheel of the register and in the course of accumulation of units upon the register the movement of the units wheel is transferred by suitable carry-over mechanism to the tens wheel, that of the tens wheel to the hundreds wheel, and so on, through the provision of the carry-over devices the detail construction of which is immaterial to the present invention.

The shaft 20 supports the levers 3 loosely thereon and one group of the levers 3 is of suitable angular formation to coöperate with the disks $b$ of the front set of registers B, while another set of the levers 3 is of similar formation to coöperate with the corresponding disks $b$ of the rearmost set of the registers B.

The rear edges of all of the levers 3, however, are in transverse alinement and the levers are held in their normal positions by means of a bail including the arms 12 rigid on the shaft 20 and a cross rod 11 connecting said arms 12 and abutting with the rear edges of said levers 3. The shaft 20 has an arm 12' extending downward therefrom and carrying a roller 15 (see Fig. 7), the roller bearing against the periphery of a cam 14 mounted on the shaft 10 on which the selectors 7, it will be remembered, are loosely carried. The cam 14 is carried on the shaft 10 just at the inner side of an adjacent one of the frame plates 1, while a second cam 16 is mounted on the same shaft 10 in spaced relation to the outer side of the said frame plate 1. The two cam members 14 and 16 are directly and rigidly supported by a hub 14ª which is loose on the shaft 10 and the cam 16 has an arm 16' connected by means of a link 17 with an arm 18 on the control or governor shaft 626 (see Fig. 7).

The initial movement of the register operating levers 3, a movement in a rearward direction always, does not affect the registers but merely moves the disks $b$ loosely upon the shaft 2. It is the subsequent or return movement of these levers 3 to their normal positions that causes the registering action of the registers B, this being due to a pawl and ratchet connection between each disk $b$ and its adjacent units wheel.

It is to be borne in mind that the construction of the accounting machine is such that the actual operation of the accumulator in ordinary accumulating is performed on the return stroke of the main shaft 625, which stroke is effected by energy stored up in springs 617 during the forward stroke or pull on the handle 501 (see Fig. 5). Necessarily in order that the power to be exerted in the operation of the machine may be a minimum amount, the springs 617 are designed as light as possible consistent with performing the required function and are of just sufficient strength, therefore, to restore the regular accumulating mechanism and associated parts to their normal positions. The addition of the denominationalizing mechanism obviously would place upon the springs 617 an additional load which they are not adapted to handle, in the absence of some provision whereby this may be avoided. It is for this reason that the denominationalizing mechanism has been so designed that it is provided with its own restoring means or power spring adapted to have its energy stored up therein as an incident to the forward stroke or initial operation of the main handle and shaft. However, special provision is made to remove the load of the said additional power spring or operating device for the denominationalizer, when a condition of independent operation of the accounting machine with respect to the denominationalizer is desired and effected. The foregoing is accomplished through the employment of the following mechanism.

*The denominationalizer drive mechanism.*

Reference is made particularly to Figs. 7 and 8 of the drawings. As seen in Fig. 7 there is provided a spring 24 connected at one end to a lug 24' on the side plate 1 of the denominationalizer frame, the other end of said spring being attached as at 25 to an operating slide 26 the innermost end of which is formed with an enlargement provided with teeth 26' adapted to mesh with the teeth of a sector 27 fixedly mounted on the main shaft 625. At its front end the slide 26 has a pin and slot guiding connection at 29 with the adjacent frame plate 1. The arm 21 which as previously mentioned is operably connected with the disabling key 9, has a pin 28 engaging with the slide 26 so that when the key 9 is depressed for the purpose of disabling the denominationalizer the slide 26 will be sufficiently lowered at its rear end to disengage its teeth 26' from the sector 27 and the disengagement is maintained so long as the key 9 remains depressed. Fig. 5 shows clearly the particular arrangement of parts just referred to as well as Fig. 8. A bracket 30 supports and guides the slide 26 at its rear portion and is peculiarly formed so as to provide spaced upwardly projecting arms 30'. The slide 26 moves between the arms 30'. The base 30'' of the bracket 30 is cut away at a point between the arms 30' and the slide 26 is permitted to perform its sliding movement only when in its normal position, namely engaged with the sector 27, and cannot be moved out of engagement with respect to the sector 27, except when the main shaft 625 is at normal, at which time the rear end of the slide is adapted to be moved downward owing to the clearance afforded by the space formed in the base of the bracket 30, adjacent to the said arms 30'. The coöperation between the parts 26 and 30 is such also that the bracket 30 forms a stop to prevent any rearward movement of the slide 26 excepting when it is engaged with the sector 27.

Having in view the foregoing, it is to be noted that the denominationalizer register operating means is only geared operatively to the power mechanism of the adding machine when the denominationalizer is in active use in conjunction with the accounting instrumentalities. The function of the denominationalizer is auxiliary and having in view the manner in which it is geared to said power devices of the accounting machine the operation of the latter is not affected in any way, so far as the handle pull is concerned when the denominationalizing mechanism is inactive. The method of gearing the mechanisms together is of importance because

Clearing the denominationalizer.

In Fig. 8 the denominationalizer and total register clearing key 19 is shown. The function of this key to clear the denominationalizer will first be described. At its lower end the key 19 is connected with an arm 31 on the left hand end of the shaft 32, a spring 31$^a$ being used to normally hold the key 19 upraised. On the right hand end of the shaft 32 is fixed the arm 33 (see Fig. 7) said arm having the pin 33' disposed so as to engage the clearing slide 34 adapted to be operated by being geared to the main shaft 625 in a manner somewhat similar to that in which the slide 26 is geared to the same shaft. For this purpose the slide 34 has the teeth 34$^a$ at its rear end engageable with the sector 35 on the right hand end of the shaft 625 and the slide 34 is mounted in a bracket 36 similar in practically all respects to the bracket 30 previously referred to. At its front end the slide 34 is slotted and guided by the member 37'. A spring 39 is attached to the slide at one end and is secured at its opposite end by a stud 37'' to the clearing sector 37. This spring is placed under tension through the connection of the slide 34 with the sector 35 and the movement of the operating shaft 625 when the denominationalizer registers B are to be cleared. A depression of the key 19 rocks the shaft 32 and raises the rear end of the slide 34 to engage it with the sector 35. The sector 37 is provided at its upper end with a toothed portion adapted to engage with pinions 2$^a$ fixed to the right hand ends of the register shafts 2 and these parts are so relatively proportioned that when the key 19 is depressed to operatively connect the parts 34 and 35, a forward stroke of the handle 501 on the shaft 625 will carry the sector 37 a sufficient distance to cause a nine-tenths revolution of the shafts 10 in a clockwise direction required for clearing, thereby restoring the various registering wheels of the registers B, which may have been previously operated, to zero positions. The return stroke of the handle 501 restores the several parts just mentioned to normal. With a view to avoiding any likelihood of undue shock or strain on the comparatively delicate registering mechanism of the denominationalizer, the sector 34 is provided with a roller 38 adapted to contact with the cam member 16 previously described, the movement of said cam member, it being recalled, being controlled through the connection of its arm 16' of link 17 with the lever 18. During an ordinary stroke of the handle 501 the cam 16 travels just fast enough to keep out of the way of the roller 38, not ordinarily contacting therewith. In the event the handle is jerked quickly forward, the cam 16, traveling as it does under the control of the governor 663, retards the movement of the sector 37 and prevents an abnormal rate of speed of the same. The governor 663 is a dash-pot connected by suitable parts shown in Fig. 7, including the shaft 1071 and arms 660 with the control lever 18 previously referred to. However, in view of the yielding connection of the clearing sector 37 with the rack 34, established by the pivot stud 37'', the rack may be carried in advance with the sector 35 and shaft 625, the spring 39 being of sufficient strength to perform the clearing operation carrying the sector 37 in the operative direction as permitted by the cam 16.

The coöperation of the cam 14 with the roller 15 on the arm 12' of shaft 20 is well illustrated in Fig. 7, the movement of the cam governing the action of the restoring bail 12 for the register operating levers 3.

Obviously when the key 19 is in its normal upraised position and the parts 34 and 35 disengaged, the clearing sector 37 virtually locks the shafts 2 of the registers B against rotation.

At this point it may be again mentioned that the registers B are of a conventional type including registering wheels loose on the supporting shafts, transfer mechanism between the registering wheels and suitable means whereby the supporting shafts may be turned nine-tenths of a revolution in order that the various wheels may be cleared or placed at zero positions. The detail form of the registers while immaterial to the present invention will be described hereinafter in conjunction with suitable illustration.

It is desirable that the operation of the clearing key 19 release any other keys of the keyboard, which may be down, including also the non-pay key, in the event the accounting machine and denominationalizer are used in association with a paying machine. For the above purpose a lever 47, see Fig. 8, is mounted upon a shaft 49 which extends entirely across the keyboard section of the machine (see Fig. 6), and said lever has a pin 47' adapted to engage against the stem of the disabling key 9, in the event the latter is depressed, whereby to force the said key 9 forward until its lug 9'' is disengaged from the keyboard plate 124, the key being thus released and restored to normal. The lever 47 is operated through the provision of a stud 19'' on the key 19, which stud engages the cam face 48' of a slide 48 which is pivotally connected with the lower end of said lever 17, as shown at 48$^a$ (see Fig. 6).

The means for releasing the total, subtotal, or non-add, as well as any and all of the amount keys 29 that may have been depressed, as controlled from the key 19, includes the following instrumentalities: Said key 19 (see Figs. 6 and 8) is formed with two oblong openings 19″ adapted to receive the cam projection of the arm 134 mounted on the short shaft 51 which also carries the arm 50, the lower end of which engages the key release bar 128 seen best in Figs. 4, 6 and 8. Obviously, therefore, depression of the key 19 and oscillation of the shaft 51 incident to the action of the cam projection of the arm 50 will reciprocate the key release bar 128 and actuate all of the locking plates 127 engaged thereby to thus release the depressed amount keys 29 from the detaining action of said plates 127. Since the release bar 128 is operable by the regular total key 135, by the provision of an arm 134 corresponding with the arm 134 above described, the total key arm 134 however, being carried by the shaft 261, it is obvious that the shafts 261 and 51 always operate together and the action of the key 19 on the arm 134 coöperative therewith will oscillate the arm 134 of the total key 135 and release the latter, should it be depressed, as an incident to taking the total by means of the key 19. In like manner the depression of the total key 134 will release the key 19 should it be depressed. The method of releasing the sub-total and non-add keys incident to the operation of the total key is a well known expedient in this art, the said sub-total and non-add keys being controlled for release, from the same shaft 261 incident to the rocking of this shaft somewhat in the same manner as previously described in regard to the total key. For the above reason the release of the sub-total and non-add keys is not additionally referred to.

*Clearing the denominational and total registering mechanisms simultaneously.*

It is apparent in view of the operation of clearing the denominationalizer as above set forth that in order to clear the total registers of the accumulator D, at the same time with the corresponding operation in respect to the denominationalizing registers B, it is only required to employ operating means intermediate the key 19 and the lever 902 seen in Fig. 3 which is ordinarily operated by the total key 135. The depression of the key 135 rocks the lever members 902 and 901 to carry the rear end of the latter out of the path of movement of the wipe pawl 511, permitting said pawl to engage the right hand pin 469 of the three-armed lever 316 (see Fig. 3). Likewise this action through the coöperation between the lever 902 and the sub-total lever 903 raises the rear end of the latter and permits engagement of the pawl 511 with the left hand pin 469 so that during the traverse of the pawl 511 incident to taking the total the pawl coöperates with the left hand pin 469 to engage the accumulator with the racks 301 as the latter start their downward excursions and the subsequent coöperation of the pawl with the right hand pin 469 disengages the accumulator from said racks as they move upward. It is to control this operation necessary to clear the registering wheels of the accumulator D that the special clearing key 19 is adapted to shift the bar 48 and arm 47 on the rock shaft 49, said shaft 49 having fixed thereto the curved arm 53 shown in Fig. 7, arranged on the end of the shaft opposite that having the arm 47. The front end of the arm 53 is bifurcated so as to receive a projection 52′ on a vertical slide 52 suitably guided in its movement by screw studs. The rocking of the shaft 49 incident to the depression of the key 19 depresses the slide 52 and the projection 52′ of said slide actuates the lever 902, owing to the fact that said projection 52′, as seen best in Fig. 6, overlies an angular projection 902ª extending from the said lever 902. Of course the actuation of the lever 902 as above described causes the lever to perform all the functions that are performed thereby when the total key 135 actuates the same lever for the purpose of taking a grand total which always results in a clearing of the accumulator. Also the operation of the key 19 to control the clearing of the accumulator shifts rearwardly the bar 45 seen in Fig. 8, which has the projection 45′ capable of engaging the cross member 265 of the release bail 132 thereby causing said bail to move rearward, the locking bars 301′ disengaging the same from the racks 301. The key 19 acts directly to move the slide 48 rearward, tilts the lever 47, rock shaft 49 and the arm 46 near the center of said shaft 49, said arm 46 being directly connected to the bar 45 aforesaid.

*Characterization mechanism.*

The special type carried 706, shown best in Fig. 8, has been previously referred to in a general way. While the printing means including said carrier are employed for characterizing purposes generally, especially as set forth in the co-pending application Serial Number 854,836 previously referred to, said means are also employed for characterizing denominationalized items set up on the keyboard and to indicate a cleared condition of the plurality of registering mechanisms employed in the combined machine. The uppermost of the types designated 725 in Fig. 8 bears the characterizing designation "D"; the lowermost, numbered 726, carries the designation "C." "D" identifies denominationalized items and "C" indicates a cleared condition of the machine, on the record tape printed by the printing mechanism shown in Figs. 2 and 8. The normal position of the type carrier 706 is such that the denominationalizing type 725 is in printing position but maintained inoperative by engagement of the pin 706' in the lowermost notch of the controlling sector 727. In the printing mechanism as shown in Figs. 2 and 8 are illustrated the regular and the special type carriers, respectively. The hammers 723ª and 700 are fired when the tails 702' of the hammer driver restraining detents 702 are carried into engagement with the enlargements 706" of the respective carriers, excepting under certain conditions as to the hammer 700 that will shortly be referred to.

The engagement between the parts 702' and 706" releases the hammer drivers 701 from the detents 702 and the hammers are fired in the customary manner. The coöperation between the parts 702' and 706" is caused by rocking of the shaft 860 correspondingly swinging the frame 703 which carries the detent 702' toward the type carriers. This rocking is imparted through lever mechanism including the parts 660 and 1071 shown in Figs. 2 and 7, and the link x connecting the lever 660 with an arm y seen in Fig. 2, by which the shaft 860 is rocked at each movement of the actuating handle 501, said movement being communicated to the shaft 1071 from the arm 60 shown in Fig. 7 as fixed on the shaft 626, there being a lever arm z fixed to the shaft 1071 and bifurcated at its lower end to engage a roller 60' on the said arm 60. This mechanism may be said to be conventional as regards this application since any suitable means may be used to transmit motion to the shaft 860 for the purpose of firing the hammers of both the printing and special type carriers.

When the type carriers 706 and 723 are in their normal positions the enlargement 706" of each type carrier will not be in the path of movement of the detent 702 and rocking of the frame or cradle 703 toward the carriers under such conditions will not effect firing of the hammers for obvious reasons, the detents 702 remaining in engagement with the hammer driver pins 868. During the operation of the denominationalizing mechanism in conjunction with the accounting machine instrumentalities described the special type carrier 706 remains at normal position and therefore some means must be provided, other than the usual projection 706", for tripping the detent 702 coöperative with the special type hammer 700 so that the characterizing type "D" will be printed after each transaction of the machine working with the denominationalizing means. The above is accomplished through the provision of a pin 702''' carried by an arm of the detent 702 coöperative with the special type carrier (see Fig. 8). Said pin 702''' is adapted to contact with the bar 40 adapted to be projected into the path of said pin as an incident to the release of the disabling key 9 which, it will be recalled, is in released position when the denominationalizer is in use. The key 9 carries a pin 9' adapted to engage the cam 41' of an arm 41 affixed to the shaft 42 so that an oscillatory movement of the shaft 42 is permitted through the action thereon of the connected spring 41". In this way the oscillatory movement of the shaft 42 is communicated to the arm 43 which is pivotally connected to the bar 40 previously referred to as coöperating with the member 702. By projecting or withdrawing the bar 40 in relation to an operative position in respect to the pin 702''' it is obvious that the hammer 700 will be fired, or restrained, as required for the purposes of characterizing the denominationalized items or not characterizing the same, respectively.

For characterizing a total incident to a clearing operation of the machine by the clearing key 19, the clearing character type 726 is provided. In this case, however, the carrier 706 is positioned with its pin 706' to engage in the uppermost notch of the sector 727 when this sector is swung into proper position by the bell crank lever 44. The lever 44 is loosely mounted on the shaft 230, and is adapted for operation rearwardly by the key 19 through the provision of the parts 45, 46, 47, 48, 49, 19, 19' previously described. In other words, depression of the key 19 actuates the members 48, 47, 49, 46, 45, 44 and 727 to set the latter in a position to stop the movement of the special type carrier 706 when the pin 706' of the latter engages the uppermost notch of said sector 727, all incident to the operation of clearing the denominationalizing registers and the totaling registers of the accounting machine. Since use of the special type carrier for the purpose of performing other characterization service is not material to the present invention such is not specifically described.

In Fig. 7 will be seen the shiftable bar 54 having four upwardly extending cams designated 54ª, 54ᵇ, 54ᶜ, 54ᵈ, and adapted to be engaged by corresponding projections 56 certain of which are carried by the total and sub-total keys while others are carried by the slide 52 and the slide 160, the latter being controlled from the non-add key of the keyboard. A depression of any one of the keys of the total, sub-total, clearing and non-add keys therefore will shift the bar 54 in a forward direction, thereby rocking a bell crank lever 55 engaged by the front end of said bar, causing the latter to assume a position in the path of the bail 12, or opposite the member 11 of said bail. Under such conditions the movement of the bail 12 is prevented so that there can by no possibility be any operation of the denominational register actuating levers 3 (see Fig. 8). This interference takes place as an incident to the clearing, total, sub-total or non-add key depression and the lever 55 has a spring 55' connected thereto to tilt the same upwardly into a non-interfering position maintained thereby during the normal operation of the machine. The lever 55 is mounted upon one of the side plates 304 of the adding rack assembly section of the machine.

*The denominationalizer mechanism in detail.*

The machine of this invention is designed to denominationalize amounts of money, in the sense of mechanically dividing each amount registered up in the machine into the least number of pieces of different denominations required to make up such amount and selecting and operating certain registers to register the different denominations that are selected. In other words, as a brief example, if a wage or other item amounts to eighteen dollars and seventy-seven cents ($18.77), by the operation of the combination machine this amount is set up on the keys just like in an adding machine. The total amount $18.77 is accumulated by the registering wheels of the accumulator D, and the denominationalizer registers are actuated so that the ten dollar register registers one unit, the five dollar register one unit, the dollar registers, of which there are two, three units (two on one register and one on the other), the fifty cent register one unit, the twenty-five cent register one unit, and one of the penny registers, of which there are two, two units. The system of currency to which the machine is adapted is that of the United States, though by modification the principle of denominationalizing is equally applicable to other currency systems.

The machine as illustrated herein is of the nine bank type capable of accumulating and listing amounts up to nine million, nine hundred ninety-nine thousand, nine hundred ninety-nine dollars and ninety-nine cents. It is, however, limited to denominationalizing amounts up to one hundred ninety-nine dollars and ninety-nine cents, all keys designated from 2 to 9 of the ten thousands row, which is the fifth row as seen in Fig. 1, being inactive in so far as the denominationalizing mechanism is concerned. Of course the ten thousands row of keys in the currency system is representative of ten thousands of cents, or hundreds of dollars.

To thoroughly grasp the principle of action or the requirements of the present machine, and bearing in mind that fourteen denominationalizing registers B are provided as described at the beginning of the general description of the denominationalizing mechanism and also referring again to the selectors 7 previously generally described, it is apparent that in order to denominationalize one hundred dollars ($100.00) the number 1 key of the hundred dollars row, the fifth bank of the keyboard is depressed. This action supplemented by the operation of the main handle and selecting devices previously referred to will set the selector 7 coöperative with the hundred dollar register B, and carried by the left hand selector shaft 4 in Fig. 8 to a position with its notched portion 7' adapted to receive the projection 3' of the coacting register operating lever 3, the handle operation permitting sufficient movement of the lever 3 to cause a single increment of movement of the hundred dollar register indicating that a hundred dollar bill will be required to pay the amount registered. Practically the same operation is incident to actuation of the two dollar key, which is the second key from the front end of the keyboard in the third row from the right, excepting that the two dollar selector 7 is like that shown in Fig. 10 and has two increments of movement imparted thereto in the operation of the machine, to bring its notched or cut-away portion of double depth opposite the projection 3' of the coacting register operating lever. During the operation of the latter a double increment of movement will be imparted to the dollar register and two units, indicative of two one dollar denominations, will be registered on the dollar register B. If the amount to be denominationalized were three dollars ($3.00) a selector, such as the selector 7 shown in Fig. 10, connected with the third selector shaft 4 from the right in Fig. 8 would be moved two positions upward to cause the subsequent double increment movement of one of the two dollar registers B, and a second selector 7 on the same selector shaft coacting with the second dollar register B would be set in a position to permit a single increment of movement of its coacting lever 3 and corresponding movement of the coacting register B, so that one register would indicate "2" and the other "1."

In the drawings the extent of movement of the several selectors 9 is shown by diagrammatic graduations beginning with a "0" and ending with a "9" so that each selector is susceptible of assuming one of ten different positions as may be required in order to position the same properly to perform its selecting functions.

Taking now a slightly more complicated condition of denominationalizing eighteen dollars ($18.00), the key "1" of the ten dollar row will be depressed and the key "8" of the dollar row. The operation of the machine will result in moving the ten dollar selector one degree of movement to its position number 1 where it is cut away ready to permit movement of the coacting lever 3. The above ten dollar selector 7 is connected with the fourth shaft 4 from the right as shown in Fig. 8. The key 8 of the dollars row controls the movement of the third shaft 4 from the right in the same figure, to which shaft are connected the dollar selectors 7. The said key 8 therefore will control movement of the shaft 4 aforesaid to a position in which its five dollar selector 7 will permit of a single increment of movement of the five dollar registering lever coacting therewith. A two dollar selector 7 on the same shaft will be positioned so as to permit of a double movement of its lever 3 to register "2" on one of the one dollar registers (note the eighth position of selector 7 shown in Fig. 10). Also the dollar selector on the same shaft with its eight degrees of movement will permit of one increment of movement of its lever 3 and register B (see the eighth position of the selector 7 shown in Fig. 9). Thus we have in the operation of the machine one increment of movement of the ten dollar register, one increment of movement of the five dollar register, a double increment of movement of one of the one dollar registers, and a single increment of movement of the other one dollar register, showing that five pieces of money, namely one ten dollar bill or gold piece, one five dollar bill or gold piece, and three one dollar coins or bills are necessary to pay the item of eighteen dollars set up in the machine.

The foregoing are typical of the more simple transactions which the denominationalizing mechanism is adapted to perform and involving the positioning of what are termed herein single selectors. The shafts 4 may be referred to as order shafts, the first shaft from the right being of the first order coöperative with the first or units bank of keys, and the second shaft 4 that of the second order coöperative with the tens bank of keys, and so on. The showing of these shafts is best in Fig. 8 and has been generally described hereinbefore. On the shaft 10 which carries the selectors 7 are mounted ten of the single selectors of which those shown in Figs. 8, 9 and 10 are typical. There are also mounted four combination selectors, of which those shown in Figs. 11 and 12 are typical. The single selectors are those which are affected only by the keys 29 of one row or order of the keyboard. The combination selectors, however, are those affected by two orders of the keyboard. Before passing to the description of the combination selectors it may be remarked that it would be within the purview of the invention instead of using two registers B for the cents, dollars and twenty dollar pieces of money, a single register for each of these might be employed with the coöperating selector 7 having notches of graduated depth to permit of one, two, three or four increments of movement of the coacting lever 3 and register B. It is preferred, however, to utilize the arrangement illustrated, for obvious reasons from a mechanical viewpoint, and having in mind also the control of a different selecting system adapted to be employed in conjunction with the accounting machine to govern the actual ejection of coins or money from the machine.

*The combination selectors.*

The four combination selectors are those corresponding with the registers provided for nickels, dimes and quarters. Two are utilized for the dimes registers, one for each. One combination selector for dimes could be employed, however, for reasons which have heretofore been generally referred to. As illustrated in the drawings, Figs. 15 and 16 show the first and second order 25¢ selectors; Figs. 17 and 18 the first and second order first 10¢ selectors; Figs. 19 and 20 the first and second order second 10¢ selectors; and Figs. 21 and 22 the first and second order 5¢ selectors.

It is to be borne in mind that though the 5¢ amount is represented by a key of the first order or row of the keyboard, the nickel register must be controlled by the keys of the second order in respect to certain amounts, as for instance 25¢ piece selections, etc. In the case of the dimes, while these are represented and controlled from the keys of the second order or tens row of the keyboard, the corresponding registers must be controlled by keys of the first order for amounts wherein a 25¢ piece is required, all owing to the fact that the 25¢ piece is to be substituted in the denominationalizing system for the selection of two 10¢ pieces and a nickel, or 5¢. Furthermore, it is apparent that the 25¢ piece being represented by keys of both the first and second orders or rows of the keyboard, it is necessary that the 25¢ register be controlled jointly from these different orders of keys at all times. The principal members of the combination selectors are well illustrated in Figs. 11 to 22 inclusive.

Each combination selector is composed of two units, the units consisting of main selectors 7ª and 7ᵈ quite similar to the single selectors 7 previously described, and auxiliary selectors 7ᵇ and 7ᶜ, the latter being are-shaped plates attached by suitable fastenings e to the lower portions of the selectors which constitute each of the members 7ª and 7ᵈ. The members 7ª and 7ᵈ are mounted on the shaft 10 in the same manner as the selectors 7 by means which will be hereafter described.

In the drawings the selectors are given position markings from "0" to "9", diagrammatic indicia for this description only. Of course the various members of the combination selector units are alike in general form but their notched or cut-away portions are varied in order to obtain a differential action of the registers in the different combinations required for the purposes of the invention. The register operating levers 3 which coöperate with the combination selectors are constructed differently from those which coöperate with the single selectors, see particularly Figs. 11 to 14 inclusive. In these figures it will be observed that the combination selector levers 3 have plates 61 pivotally secured intermediate their ends to the lower arms 3″ of said levers and held in normal positions by the springs 62. Each member 61 has spaced projections E and F at its upper end and the single projection G at its lower end, the former projections coöperative with the adjacent edges of the main selectors 7ª and 7ᵈ and the latter projection coöperative with the adjacent edges of the auxiliary selectors 7ᵇ and 7ᶜ.

The arrangement of the members of each combination selector unit is such that the zero position of the main selector 7ª or 7ᵈ as the case may be, is opposite the projections E—F, and the zero position of each of the auxiliary selector members 7ᵇ or 7ᶜ as the case may be, is opposite the projection G. Furthermore the parts are so proportioned that in order for the member 3 to rock on its shaft 20 a sufficient distance to cause the registration of a unit on the coacting register B, notches on both the first and second order main or auxiliary selectors must be brought into a position to receive the projections E—F, or the projection G respectively.

Since each main selector 7ª and 7ᵈ is connected by a link 6 with its particular order shaft, differential positioning of these selectors and the attached auxiliary selectors is controlled from the first and second order shafts 4 and the levers 500 coöperative with said shafts in a manner previously set forth. To clearly understand the operation of the selector mechanism, furthermore, it should be remembered that it is possible in relation to each combination selector that the units may move independently one with respect to the other, or one may be stationary while the other moves, all depending upon the required adjustment to control the particular selection to be made.

To understand the operation of the selection of nickels, reference is made particularly to Figs. 21 and 22. Assuming that no keys of the second order are depressed and consequently the corresponding selector members 7ᵈ and 7ᶜ are at zero or normal, if any one of keys 1, 2, 3 or 4 of the first order or row of keys 29 is depressed, as the handle 501 is operated, the member 3 being released by rearward movement of the bail 12 as its roller 15 follows the cam 14, will have a tendency to rock as actuated by the spring 13. This brings the member 61 against the periphery of the selectors 7ª, 7ᵇ, 7ᶜ and 7ᵈ, as shown in the figures just mentioned. This movement of the member 3 is not sufficient to affect the coöperating register B since the projection E of the member 61 rests on the position 1, 2, 3 or 4 as graduated on the member 7ª, while the projection G of the same member 61 rests on the zero or "0" position of selector 7ᶜ (Fig. 22). The operative condition necessary for an actuation of the register, namely that the notches of both the first and second order selectors must be brought into position to receive either one of the ends of the plate 61, has not been brought about and therefore the register is not affected.

Now supposing that with all the second order or row of keys 29 still at normal, the key 5, 6, 7, 8 or 9 of the first or pennies order is depressed and the handle 501 operated. Now the projections E and F will engage at the cut-away portions at the graduations 5, 6, 7, 8 or 9 of the selector 7ª (Fig. 21) and zero or "0" of selector 7ᵈ (Fig. 22), respectively, while projection G will rest on positions 5, 6, 7, 8 or 9 and "0" of selectors 7ᵇ and 7ᶜ. In this condition it will be observed that the required operative condition has been brought about and the nickel register will accordingly be affected in the operation of the machine.

If now in combination, key 1 is set up in the second order of keys 29 and 1, 2, 3 or 4 in the first order, no nickel selection will result owing to the interference of the selector 7ª at any of its positions 1, 2, 3 and 4 (Fig. 21), with the projection E of plate 61; also the interference of position 1 of the selector 7ᶜ (Fig. 22) with the projection G. If, however, a key 5, 6, 7, 8 or 9 is set up in the first row or order of keys 29 there will be a nickel selection because of the non-interference of positions 5, 6, 7, 8 and 9 of selector 7ª (Fig. 21) and the position 1 of selector 7ᵈ (Fig. 22) with respect to the projections E and F.

If key 2 of the second order of keys 29 is set up in combination with a key 1, 2, 3 or 4 of the first order or row there will be no nickel selection because of the interference of positions 1, 2, 3 and 4 of selector 7ª and the position 2 of selector 7ᶜ; and if in combination with the key 5, 6, 7, 8 or 9 of the first order or row there will be no register selection because of the interference of positions 5, 6, 7, 8 and 9 of selector 7ᵇ and position 2 of selector 7ᵈ.

If key 3 of the second order or row of keys 29 is set up in combination with a key 1, 2, 3 or 4 of the first order there will be a selection because of the non-interference of positions 0, 1, 2, 3 and 4 of selector 7ᵇ and position 3 of selector 7ᶜ; and if in combination with key 5, 6, 7, 8 or 9 of the first order there will be no selection because of the interference of positions 5, 6, 7, 8 and 9 of selector 7ᵇ and position 3 of selector 7ᵈ.

If key 4 of the second order is operated in combination with the selector positions 0, 1, 2, 3 or 4 of the first order there will be a selection because of the non-interference of positions 0, 1, 2, 3 or 4 of selector 7ᵇ and the position 4 of selector 7ᶜ; and if in combination with positions 5, 6, 7, 8 or 9 of the first order there will be no selection because of interference of positions 5, 6, 7, 8 and 9 of selector 7ᵇ and position 4 of selector 7ᵈ.

If key 5 of the second order is set up moving its selector to the position 5 in combination with positions 0, 1, 2, 3 or 4 of the first order selector, there will be no operation of the registers because of the interference by positions 0, 1, 2, 3 and 4 of selector 7ᵃ and position 5 of selector 7ᶜ; and if in combination with positions 5, 6, 7, 8 or 9 of the first order there will be a selection because of the non-interference of positions 5, 6, 7, 8 or 9 of selector 7ᵃ and position 5 of selector 7ᵈ.

It will be observed that the operations of selecting nickels for amounts from fifty cents to ninety-nine cents inclusive are practically repetitions of those for amounts from 0 to forty-nine cents inclusive.

In the foregoing, while the selection of nickels only has been considered, it should be borne in mind that all first and second order selectors, both single and combination, *i. e.*—those connected with the first or second order distributing shafts 4, have been making their proper selections and registering accordingly, the dimes and quarters being registered whenever their combined selectors produced the above specified condition incident to presenting their cut-away portions or notches 7′ to receive the proper projection of the member 61 of the lever 3.

Illustrating further the selective principle of the above mechanism, we will take an example of the selection of the denominationalizing of forty cents incident to a depression of the fourth key of the second or tens row of the keyboard of the machine. This depression through the later controlling action of the tens lever 500 results in moving the second order shaft 4 and the unit of the 25¢ combination selector shown in Fig. 16 so that the latter assumes its "4" position, so to speak. In this 4 position the cut-away portion *m* of the selector 7ᶜ is brought opposite the cut-away portion "0" of the selector 7ᵇ which has remained at zero position and therefore a movement of the 25¢ register lever 3 is permitted incident to the entering of the projection G into the cut-away portions of the parts 7ᵇ and 7ᶜ. A quarter out of the forty cent amount is handled by the above selectors. In addition to the above action the first 10ᶜ selector (see Figs. 17 and 18) is affected by the depression of the said 40¢ key so that the second order auxiliary selector 7ᶜ has its cut-away portion *n* at the fourth position disposed opposite the cut-away portion *n* of the auxiliary selector 7ᵇ which has not been moved, permitting the entering of the projection G into said cut-away portions and the corresponding operation of one of the 10¢ registers. The last described selection handles ten cents of the amount of forty cents. To complete the denominationalizing of the forty cent amount the nickel register must be operated one increment of movement to register up the nickel and this is done owing to the positioning of the nickel combination selectors shown in Figs. 21 and 22 so that the second order selector 7ᶜ which is moved to its "4" position has its cut-away portion *o* at such position opposite the cut-away portion at zero "0" of the selector 7ᵇ so that the projection G of the nickel register actuating lever 3 may enter these cut-away portions and establish the required condition which has been dwelt upon hereinbefore. Thus the depression of the 40¢ key affects three different combination selectors to insure the mechanical dividing up of the sum of forty cents into a 25¢ piece, a 10¢ piece, and a nickel, each of which units of denominations of money are registered on their respective registers B.

Still another example of the combination change selection principle is incident to the denominationalizing of sixty-five cents. The units of denominations required to make up sixty-five cents are a 50¢ piece, a dime and a nickel. The amount is set up on the machine by depressing the 6 key of the second order or row of keys 29 and the 5 key of the first order or row of the same keys 29. The depression of the 6 key of the second order sets the 50¢ selector, shown in Fig. 8, in its 6 position. This is a single selector of course and in its 6 position its register actuating lever 3 is permitted of movement incident to entering of the projection 3′ into the cut-away portion or notch 7′ of the selector. The movement of the second order shaft 4 also causes a movement of the nickel combination selector shown in Fig. 22 to the 6 position, in which position it will be noted that the selector 7ᵈ has its 6 position notch opposite the projection F of member 61. Furthermore the 5 key of the first order having been also actuated the first order selector 7ᵃ is adjusted to its 5 position with its 5 position notch opposite the adjacent projection E of the member 61, permitting movement of said member for the actuation of the nickel register. Again, the first 10¢ combination selector illustrated in Figs. 17 and 18 is operated in the sixty-five cent denominationalizing action so that the selectors 7ᵃ and 7ᵈ assume their 5 and 6 positions, bringing their notches opposite the projections E and F of the member 61, whereupon a registering action of the first 10¢ register B is permitted. The operation of the 65¢ keys thus effects a registration in a transaction of the machine, of 50¢, 10¢ and 5¢ on the several registers B.

It is not believed necessary to describe in detail very many of the adjustments that may be obtained through the operation of the various selectors either single or combination. However, with a view to graphically illustrating several specific transactions Figs. 23, 23ᵃ, 23ᵇ and 23ᶜ represent a group of figures illustrating the adjustment of the various selectors single and double necessary for the denominationalizing of the amount of fifty-eight cents. The positions that have been taken by the selectors are assumed as a result of depression of the fifth key of the tens row of the keyboard and the eighth key of the units row. In these figures the positions assumed by the selectors are diagrammed after a manner by using the designations 0 to 9 inclusive, same, of course, not being employed in the actual machine.

Figs. 24, 24ᵃ, 24ᵇ, and 24ᶜ are representative in a manner similar to those mentioned in the last paragraph of the adjustments of certain selectors incident to denominationalizing eighty-seven cents.

In Figs. 25, 25ᵃ and 25ᵇ are illustrated in a like manner the positions assumed by the selectors as a result of the depression of the keys for the denominationalizing of thirty-seven cents.

The view illustrated by Fig. 26 is of the adjustment of the parts as shown in Fig. 25, more clearly illustrating the coöperation.

Mechanical mounting of selectors.

The manner in which the single selectors 7 and the combination selectors 7ᵃ and 7ᵈ are mounted upon their shaft 10 is peculiar and a detail feature of the invention. Inserted in grooves equi-angularly spaced in the shaft 10 are holding strips 10ᵃ. The several selectors are provided, of course, with openings to receive the shaft 10 and from each opening of a selector extend the divergent slots 7ˣ adapted to receive the strips 10ᵃ aforesaid. Each strip 10ᵃ is formed with notches, one for each selector 7, or 7ᵃ or 7ᵈ as the case may be, and the selectors are assembled on the shaft 10 by moving each selector lengthwise of the shaft with the slots 7ˣ registering with the strips 10ᵃ. Thereafter the selectors 7 are moved rotatively a sufficient degree to cause non-registration of the slots 7ˣ and strips 10ᵃ, whereupon the selectors are positioned against lengthwise displacement by engagement in the notches which permit of said rotative movement. Furthermore, after once assembled the extent of rotative movement of each selector under actuation by its link 6 is less than the angle prescribed by the relation of the strips 10ᵃ and in addition to lateral displacement of the selectors being prevented a minimum amount of friction incident to the required oscillating movement of the selectors is secured.

In view of the peculiar action of the various coöperating parts of the accounting and denominationalizing mechanism it will be understood that the levers 500 are, broadly speaking, differentially operating members for the accumulating and printing mechanisms, that the shafts 4 are order devices corresponding with the orders of the levers or members 500 as well as the orders of the keys 29, all in accordance with the orders of the decimal system of calculation, coinage or computation.

It will furthermore be understood that the spring 24 is virtually an energy storing device thrown into action as an incident to conjoint operation of the adding machine and denominationalizing instrumentalities and disabled when these instrumentalities are adjusted for operation one independently of the other.

Money paying mechanism.

This mechanism is shown best in Figs. 1 and 27 to 30 inclusive. The invention as hereinbefore set forth in detail may comprise a complete machine adapted for adding, listing and denominationalizing different amounts. However, the usefulness of the present invention is rendered more extensive if the various mechanisms hereinbefore set forth have combined therewith devices whereby money may actually be paid out mechanically under the control and incident to the ordinary operation of the accumulating and listing mechanism. With the foregoing in view, and also with the object of establishing a peculiar interdependence of action between the denominationalizing mechanism and the paying mechanism, the latter will now be set forth in as much detail as is necessary for the purposes of this description, it being understood, however, that the particular paying instrumentalities now to be described are not, specifically speaking, necessary for the purposes of this invention because equivalent paying mechanism might readily be employed.

As seen in Figs. 1 and 27, suitable coin receptacles 70 which correspond in respect to number and the denominations of money which they are adapted to hold, with the number and denominations of money registrable by the denominationalizing registers B, are provided. Ejectors 1307 (see Fig. 28) are operable by arms 545 on an ejector shaft 615 whereby one or two coins, as the case may be, may be discharged from the base of a receptacle 70 coöperative with a particular ejector. The ejector shaft 615 is operable from the main shaft 625 of the adding machine owing to the provision of an arm 625' having a stud engaging a forked lever 515 on the stub shaft 515' mounted to oscillate in the left hand frame of the adding machine section. The shaft 515' carries an upwardly extending arm 515" the latter having a stud 515ª engaged by a hook 542 connected with the arm 615' mounted on the right hand end of the ejector shaft 615. A spring 615" yieldingly holds the hook 542 engaged with the stud 515ª. It will be obvious that when the main shaft 625 is rocked, corresponding rocking movement will be imparted to the ejector shaft 615 through the connecting arms and members just described. The above action takes place so long as the hook 542 remains in the position shown in Fig. 30 and incident to each operation of the main shaft 625 by the handle 501.

Should it be desired to discontinue the operation of the ejectors 1307 by the shaft 615 it is only necessary to depress the disabling key 72 until its notch 72' engages the top plate of the keyboard section of the machine. This action causes a stud 282 at the lower end of the key 72 to depress an arm 73 on a short shaft 74 which shaft carries an arm 75 disposed above the hook 542 and adapted on the depression of the key 72 to correspondingly lower the hook 542 in such a manner that rocking of the arm 515" will not effect movement of the arm 615', permitting the ejector shaft 615 to remain stationary, see especially Figs. 29 and 30 for above detail parts.

It being understood that the ejectors 1307 are adapted to be operated from the prime mover of the adding and listing machine, namely the shaft 625, the manner in which the ejectors are selected to pay out predetermined sums of money equivalent to the amounts represented by actuated amount keys 29, will now be set forth.

For this purpose the ejector selectors 1371 (seen best in Figs. 27 and 28) are used. These selectors are long bars having hooks at their right hand ends and each provided with one or more ejector bail engaging lugs 1371' coöperative with the ejector bails 1370 (see Fig. 28). The bails 1370 are pivotally supported members mounted in suitable plates secured to the base of the machine, each bail having an extension 1370' on one of its legs directly engaging the rear portion of an ejector. The ejector selectors 1371 have upwardly extending projections 1371" near the hooks 1371ª previously mentioned, the projections 1371" being located beneath the keys 29. The selectors 1371 are normally upheld by springs, as shown, and on each operation of a key 29 a selector or selectors 1371 are depressed or lowered so that their hooks 1371ª engage over an actuating bail 520 carried by a shaft 520' at the right side of the adding machine section (see Figs. 29 and 30). On each operation of the handle shaft 625 under normal conditions of action of the paying mechanism a cam 502 fixed to said shaft engages a roller 691 on a lever 523 pivoted at 674 and connected to a link 950 which has detachable engagement by a projection 675 with an arm 521 on the shaft 520'. The action of the cam 502 is such that as the handle 501 is pulled forward the lever 523 is rocked, pushing downward on the link 522 and imparting rocking movement to the shaft 520' and its bail 520. The tilting of the bail 520 in the above manner forces the same to the right as seen in Fig. 27 and causes a pull in a rightward direction in respect to any one or more ejector selectors 1371 which may have been depressed sufficiently to engage their hooks 1371ª with said bail 520. The movement of the selector or selectors 1371 in this manner through the lugs 1371' communicates corresponding movement to coöperating selector bails 1370 previously referred to, thereby shifting the rear ends of the connected ejectors 1307 sufficiently to cause engagement of a lug 1307' on the rear end of each ejector with a bifurcation at the lower end of the adjacent arm 545. Normally the ejectors 1307 occupy positions in which their projections 1307' are disengaged from the bifurcated lower extremities of the arms 545 and these arms are free to move without actuating the ejectors unless the latter are moved by a previous selecting action of the parts 1370, 1371 and 520, all except the latter controlled from the keys 29. Thus it is that if the one cent key 29 is depressed a selector bar 1371 having one lug 1371' engaging the bail 1370 coacting with the one cent ejector 1307 will be operated incident to the movement of the bail 520 and carried into engagement with its arm 545, to be later moved longitudinally to eject a penny incident to the rocking of the arm 545 through the connections 615, 615', 542, 515" and 515, previously described.

It is desirable that when the key 72 is depressed to disable the operation of the ejector mechanism as above set forth, the ejector selecting mechanism also be rendered inactive, for which purpose the lowering of the key 72 will tilt a lever 161 (see Fig. 30) mounted on the shaft 229 and connected with a spring 161', the stud 282 being adapted to engage the lower arm 161ª of said lever. The shaft 229 carries an arm 163 engaging the forked upper end of a lever 949 pivoted on the shaft 1033. Said lever 949 is connected by a link 950 with the link 522 provided intermediate the lever 523 and the arm 521. By depressing key 72 motion is communicated through the various parts just mentioned, whereby to withdraw the projection 675 of the link 522 from the opening in which it is received in arm 521 so that when the ejector mechanism is disabled the selector bail 520 is likewise rendered inactive owing to its disconnection from the operating cam 502.

All of the foregoing described mechanism is presented fully in the co-pending application of Robert T. Brockman for money handling machine, filed January 28, 1915, Serial Number 4893, and no claim is made therefore for the specific instrumentalities employed.

It is to be borne in mind that in the making up of payrolls one of the first steps to take is to determine how much money will be required to pay the various amounts representing the wage items of the payroll, said amounts being usually placed in envelops or similar containers to be distributed to employees. Obviously the above operation as performed on this machine incident to the ordinary operation of the adding, totaling, listing and denominationalizing mechanisms should not be accompanied with any paying out operation of the paying mechanism. Therefore it is contemplated that when the denominationalizing operation is to be performed the paying mechanism shall ordinarily be inactive, for which purpose the depression of the key 72 to disable the paying out mechanism may be utilized to automatically release the disabling key 9 of the denominationalizing mechanism should the latter be depressed, thereby adjusting said denominationalizing mechanism for conjoint action with the adding machine. Reference being had to Figs. 8, 31 and 32, the means for the purpose just referred to will now be set forth.

Beneath the top plate 124 of the keyboard, at the left hand portion adjacent to the several keys 9, 19, and 72, is mounted a controlling device comprising a slide 77 held in place and guided in its movement by screws 78 passing through slots therein. The keys 9 and 72 pass through openings in the plate 124 and in the slide 77 and the projections 9″ and 72′ respectively of said keys, by which they are held in depressed positions and perform the additional function of camming the slide 77 in a predetermined direction in order to obtain the desired coöperation between the keys 9 and 72. With the above construction in mind it will be understood that if the denominationalizer disabling key 9 is in a depressed position rendering the denominationalizing mechanism inoperative and the key 72 is thereafter depressed to render inoperative the paying mechanism, the projection 72′ of the latter key by cam engagement with the plate 124 will force the slide 77 toward the front of the keyboard disengaging the projection 9″ of key 9 from beneath the plate 124 and permitting said key 9 to normalize through the action of a suitable restoring spring connected thereto. The above operation causes the denominationalizing mechanism to be thrown into action as an incident to the disabling of the paying mechanism.

An action reverse to that above described is obtainable in that while the disabling key 72 is depressed the subsequent depressing of the key 9 will force the slide 77 forward and pull the projection 72′ out of engagement with respect to the plate 124 permitting the key 72 to be normalized by its corresponding restoring spring attached thereto.

There is still another coöperative effect obtainable owing to the provision of the controlling device 77. Such effect is incident to the operation of the clearing key 19 which upon depression, it will be remembered, causes a rearward movement of the bar 48 and through tilting of the lever 47 frees the key 9 from its depressed position, if it has been depressed, by causing a movement of said key toward the front of the keyboard. Obviously such movement of the key 9 will be communicated to the key 72 should the latter likewise be depressed so that when the clearing key 19 is operated to clear the denominationalizing and accumulator mechanisms the keys 9 and 72 will be necessarily restored.

It will be understood that owing to the proportioning of the size of the openings in the slide 77 both of the keys 9 and 72 may remain in depressed positions at the same time so that both the paying mechanism and the denominationalizing mechanism will be inactive during the operation of the regular adding machine instrumentalities.

*The denominationalizing registers in detail.*

As seen in Figs. 34 to 36 the actuating disk $b$ is carried by a lug $b'$ and has connected therewith the operating pawl $c$ arranged to engage a toothed ratchet with which the units wheel $B'$ is formed. Obviously rotative movement of the member $b$ will impart corresponding movement to the units wheel $B'$ through said pawl $c$. The movement of the units wheel $B'$ is communicated to the tens wheels $B^7$ by the pawl $B''$ carried by the units wheel on the side opposite its ratchet $d$. The pawl $B''$ has the lateral projection or nose $B^4$ operating on a cam $B^5$ fixed to the shaft 2. The cam $B^5$ has a depressed or eccentric portion adapted to permit the nose $B^4$ of the pawl $B''$ to engage the ratchet $d$ of the tens wheel $B^7$ when the units wheel has been turned to the point of its final tenth of a revolution. A spring $B^3$ acts on the pawl in an obvious manner and after the pawl $B''$ has engaged the ratchet $d$ of the tens wheel $B^7$ and shifted it a tenth of a revolution to secure the usual transfer or carry over said nose B⁴ is adapted to pass back onto the concentric portion of the cam B⁵ and to remain out of engagement with the ratchet *d* until the next transfer is to take place.

The carry over action is the same as above between the tens and hundreds wheels of the register and those of larger denominations.

The zercizing of the register takes place incident to the operation of the lever 37 as previously described, the same being adapted to turn the shaft or shafts 2 of the registers B whereby to rotate the cams B⁵ until abrupt shoulders formed by projections B⁸ on said cams, engage with the noses B⁴ of the various pawls B'', turning back to zero in such operation the several wheels of the register and thereby placing the latter in cleared condition. The cams B⁵ are formed with lugs B⁶ entering a groove in the shaft 2 to insure rotation of the cams with the shaft. The mode of assembly of the parts of the register being immaterial, is not described.

Recapitulation of operations.

A machine incorporating the general mechanisms hereinbefore set forth in detail is characterized in that it is a combination adding, listing, paying and denominationalizing machine. Furthermore it is to be understood that owing to the provision of convenient controlling devices any one or more of the general mechanisms including the paying, accumulating and denominationalizing instrumentalities, but excepting the listing mechanism, is adapted to be disabled, whereby the remaining coöperatively associated mechanisms will constitute a complete machine. In other words, owing to the advantageous intermediate connections employed the present invention may be used as the combination machine previously referred to, as an adding and listing machine alone, as a listing machine alone, as an adding, listing and paying machine, as an adding, listing and denominationalizing machine, and as a listing and money paying machine. The disabling of the accumulator is accomplished by the non-add key previously referred to herein.

It is to be furthermore borne in mind that when the denominationalizing function of the machine is unnecessary there are certain conditions incident to the use of the paying mechanism when it might be desirable that the number of coins ejected from the machine during the operation of the paying devices may be counted. This may be done by having the paying mechanism work simultaneously with the denominationalizing registers, the latter acting then to count one by one the coins ejected from the different coin holders of the machine.

It is furthermore to be understood that an independent clearing action of the denominationalizing mechanism is obtainable. For instance, supposing a list has been run and the total taken, the adding machine is cleared, of course, incident to the taking of the total, but the denominationalizing mechanism remains to be cleared under separate manual control by the depression of the clearing key and operation of the main actuator.

It is also to be understood that the total, sub-total, non-pay and elimination keys coöperate to nullify the action of the denominationalizing character printing means though they do not operate to disconnect the denominationalizing mechanism from the operating instrumentality of the machine. The elimination or non-add key operates to perform the function of disabling or preventing action of the denominationalizer simultaneously with the disabling of the accumulator, the latter being, of course, directly controlled by the said elimination key.

Having thus described the invention, what is claimed is:

1. In a machine of the class described, the combination of accounting means including accumulating and printing mechanisms, operating levers intermediate said mechanisms, indexing means controlling differential action of said levers whereby to control the accumulating and printing operations, a denominational registering mechanism for making calculations related to items accumulated and printed by the aforesaid mechanisms, and means for differentially controlling the denominational registering mechanism from said levers.

2. In a machine of the class described, the combination of accounting means including accumulating and printing mechanisms, operating levers intermediate said mechanisms, indexing means controlling differential action of said levers whereby to control the accumulating and printing operations, a denominational registering mechanism for making calculations related to items accumulated and printed by the aforesaid mechanisms, means for differentially controlling the denominational registering mechanism from said levers and including selector mechanism operatively connected with the levers, and a main actuator for the accounting means coöperative with the denominational registering mechanism.

3. In a machine of the class described, the combination of accounting means including accumulating and printing mechanisms, operating levers intermediate said mechanisms, indexing means controlling differential action of said levers whereby to control the accumulating and printing operations, a denominational registering mechanism for making calculations related to items accumulated and printed by the aforesaid mechanisms, means for differentially controlling the denominational registering mechanism from said levers and including selector mechanism operatively connected with the levers, a main actuator for the accounting means coöperative with the denominational registering mechanism, and means for disabling the operative connections between said selector mechanism and said levers.

4. In a machine of the class described, the combination of accounting means including accumulating and printing mechanisms, operating levers intermediate said mechanisms, indexing means controlling differential action of said levers whereby to control the accumulating and printing operations, a denominational registering mechanism for making calculations related to items accumulated and printed by the aforesaid mechanisms, means for differentially controlling the denominational registering mechanism from said levers and including selector mechanism connected with said levers, and denominational register operating members controlled by said selector mechanism.

5. In a machine of the class described, the combination of accounting means including accumulating and printing mechanisms, operating levers intermediate said mechanisms, indexing means controlling differential action of said levers whereby to control the accumulating and printing operations, a denominational registering mechanism for making calculations related to items accumulated and printed by the aforesaid mechanisms, means for differentially controlling the denominational registering mechanism from said levers and including selector mechanism connected with said levers, denominational register operating members controlled by said selector mechanism, operating means for the denominational registering mechanism, other operating means for the accounting means, and an instrumentality whereby to connect the last two operating means together and disconnect the same.

6. In a machine of the class described, the combination of accounting means including accumulating and printing mechanisms, operating levers intermediate said mechanisms, indexing means controlling differential action of said levers whereby to control the accumulating and printing operations, a denominational registering mechanism for making calculations related to items accumulated and printed by the aforesaid mechanisms, means for differentially controlling the denominational registering mechanism from said levers and including selector mechanism connected with said levers, denominational register operating members controlled by said selector mechanism, operating means for the denominational registering mechanism, other operating means for the accounting means, an instrumentality whereby to connect the last two operating means together and disconnect the same, and means for disabling the operative connections between the selector mechanism and said levers.

7. In combination, an accounting machine including accumulating mechanism, manipulative keys controlling the operation of said mechanism, a main actuator for operating the accumulating mechanism, a denominationalizing registering mechanism, means whereby said denominationalizing registering mechanism is also controlled from said manipulative keys, means whereby the denominationalizing registering mechanism is operated as an incident to the operation of the main actuator aforesaid, means for controlling printing totals accumulated by the accumulating mechanism, and means coöperative with the last named means for clearing the registering instrumentalities of the accumulating and denominationalizing mechanisms.

8. The combination of an accounting machine including accumulating mechanism, keyboard controlling devices for said mechanism, said accumulating mechanism including differentially operating members, a denominationalizing registering mechanism associated with said accumulating mechanism and including a plurality of registers, a main actuator controlling the operation of said accumulating mechanism, actuating members for the registers of the denominationalizing mechanism, selector mechanism controlling the action of said actuating members, means for coupling and uncoupling the selector mechanism in relation to the differentially operating members above referred to, operating means controlling the operation of the actuating members of the denominationalizing registers, and means for uncoupling and coupling the latter in respect to said main actuator.

9. The combination with an accounting machine comprising accumulating and printing mechanisms, differentially movable members connecting said mechanisms together, key controlled indexing mechanism for determining the differential movement of said differentially movable members, of denominationalizing registering mechanism separate from the accounting mechanism proper and including a plurality of registers, a main actuator for said accounting machine, selector devices controlled from the differentially movable members aforesaid and coöperative with the registers of the denominationalizing mechanism, and means controlled from the main actuator for operating the registers as controlled by said selector devices.

10. The combination, with an accounting machine comprising accumulating mechanism and differentially operating levers, means to differentially control the operation of the accumulating mechanism including key operated indexing devices, of denominationalizing means for items accumulated in the accumulating mechanism comprising a plurality of registers adapted to register a plurality of denominations of money equivalent in value to an item representing a transaction of said accounting machine, operating members for said registers, selector mechanism controlling the action of said operating members, and operatively connected with the differentially operating levers, and a main actuator for the accounting machine instrumentalities common thereto and to the operating members of the denominationalizing registers.

11. The combination, with an accounting mechanism and differentially operating levers for actuating said mechanism, means to differentially control the operation of the accounting mechanism including key operated indexing devices, of denominationalizing means for items performed on the mechanism comprising a plurality of registers adapted to register a plurality of denominations of money equivalent in value to an item representing a transaction of said accounting machine, operating members for said registers, selector mechanism controlling the action of said operating members and operatively connected with the differentially operating levers, a main actuator for the accounting machine instrumentalities common thereto and to the operating members of the denominationalizing registers, means for discontinuing the operative relation between the operating members of the denominationalizing registers and said main actuator, and means for uncoupling the selector mechanism from the differentially operating levers, whereby the accounting instrumentalities may be operated independently of the denominationalizing mechanism.

12. The combination, with an accounting machine comprising accumulating and printing mechanisms and differentially operating levers intermediate said mechanisms, means to differentially control the operation of the accumulating and printing mechanisms including key operated indexing devices, of denominationalizing means for items accumulated in the accumulating mechanism comprising a plurality of registers adapted to register a plurality of denominations of money equivalent in value to an item representing a transaction of said accounting machine, operating members for said registers, selector mechanism controlling the action of said operating members and operatively connected with the differentially operating levers, a main actuator for the accounting machine instrumentalities common thereto and to the operating members of the denominationalizing registers, means for discontinuing the operative relation between the operating members of the denominationalizing registers and said main actuator, means for uncoupling the selector mechanism from the differentially operating levers whereby the accounting instrumentalities may be operated independently of the denominationalizing mechanism, and lock means for positively preventing operation of the register operating members when the denominationalizing mechanism is inoperative in respect to the accounting machine instrumentalities.

13. In a machine of the class set forth, the combination with adding mechanism and means to control and operate the same for accumulating items, of a separate calculating mechanism operable in conjunction with said adding mechanism and including registering mechanism, a clearing device common to both the said adding and registering mechanisms, and other means whereby to clear one of the mechanisms alone.

14. In a machine of the class set forth, the combination of manual means for predetermining an amount or accounting transaction, separate accounting instrumentalities for performing separate arithmetical computations with respect to the amount predetermined by said manual means, and means for simultaneously resetting the said separate accounting instrumentalities, and for resetting one of them independently of the other.

15. In a machine of the class set forth, the combination with adding mechanism and means to control and operate the same for accumulating items, of a separate calculating mechanism operable in association with said adding mechanism and including registering mechanism, a clearing device common to both the said adding and registering mechanisms, and a positive lock adapted to prevent registering operation of the said separate calculating mechanism when the clearing device is actuated.

16. In a machine of the class set forth, the combination with adding mechanism and means to control and operate the same for accumulating items, of a separate calculating mechanism operable in association with said adding mechanism and including registering mechanism, a clearing device common to both the said adding and registering mechanisms, total taking mechanism cooperative with the adding mechanism, a total key controlling the total taking mechanism, and a locking device for preventing registering operation of the said separate calculating mechanism when either the total key or the clearing device aforesaid is actuated.

17. The combination with an accounting machine including accumulating and printing mechanisms, differentially operating members intermediate said mechanisms, manipulative keys to control the action of said differentially operating members and arranged according to the different orders of the decimal system, there being one differentially operating member for each order of the keys, a main actuator for said accounting machine, a denominationalizing registering mechanism embodying a plurality of registers of different orders corresponding with the orders of keys aforesaid, selector mechanism comprising selectors of different orders connected with corresponding orders of the differentially operating members of the accounting machine, register operating devices controlled by the selectors to make certain calculations in reference to items accumulated and printed by the accounting machine, and means to control the action of said register operating devices from the main actuator of the accounting machine.

18. The combination with an accounting machine including accumulating and printing mechanisms, differentially operating members intermediate said mechanisms, manipulative keys to control the action of said differentially operating members and arranged according to the different orders of the decimal system, there being one differentially operating member for each order of the keys, a main actuator for said accounting machine, a denominationalizing registering mechanism embodying a plurality of registers of different orders corresponding with the orders of keys aforesaid, selector mechanism comprising selectors of different orders connected with corresponding orders of the differentially operating members of the accounting machine, register operating devices controlled by the selectors to make certain calculations in reference to items accumulated and printed by the accounting machine, means to control the action of said register operating devices from the main actuator of the accounting machine, and means to render the denominationalizing mechanism inactive in respect to the coöperative instrumentalities of the accounting machine.

19. The combination with an accounting machine including accumulating and printing mechanisms, differentially operating members intermediate said mechanisms, manipulative keys to control the action of said differentially operating members and arranged according to the different orders of the decimal system, there being one differentially operating member for each order of the keys, a main actuator for said accounting machine, a denominationalizing registering mechanism embodying a plurality of registers of different orders corresponding with the orders of keys aforesaid, selector mechanism comprising selectors of different orders connected with corresponding orders of the differentially operating members of the accounting machine, register operating devices controlled by the selectors to make certain calculations in reference to items accumulated and printed by the accounting machine, means to control the action of said register operating devices from the main actuator of the accounting machine, and means for operatively disconnecting the selectors from the differentially operating members aforesaid.

20. In combination, an accounting machine comprising accumulating mechanism including differentially operating levers, manipulative keys arranged in different orders according to the decimal system, an order of said keys being provided for each of the differentially operating levers, said keys controlling the differential movement of the levers, a denominationalizing mechanism comprising a plurality of registers adapted to register pieces of money of different denominations required to make up an item accumulated in the accumulator of said accounting machine, a selector mechanism including selectors of different orders, means intermediate the selectors and the said registers whereby the latter are operable under the control of the selectors, a plurality of order devices connected with the selectors, connections intermediate the order devices and the differentially operating levers whereby the differential action of the levers controls the action of the selectors through the said order devices, and instrumentalities whereby the main actuator of the accounting machine controls the operation of the denominationalizing registers.

21. In a machine of the class described, the combination with adding mechanism, of total taking mechanism associated therewith, a total key controlling the action of said total taking mechanism, calculating mechanism operable in conjunction with the adding mechanism to make special calculations in relation to transactions performed by the adding mechanism, means to disable said calculating mechanism, the calculating mechanism including registers, means to control the clearing of the registers of the calculating mechanism, and means whereby said disabling means may be operated from said clearing control means.

22. In a machine of the class described, the combination with adding mechanism, of total taking mechanism associated therewith, a total key controlling the action of said total taking mechanism, calculating mechanism operable in conjunction with the adding mechanism to make special calculations in relation to transactions performed by the adding mechanism, means to disable said calculating mechanism, the calculating mechanism including registers, a clearing key coöperative with the registers aforesaid in order to zeroize the same, and means intermediate said clearing key and the disabling means for rendering the latter inactive in respect to performance of its disabling function as an incident to operation of the clearing key.

23. In combination, an adding machine, a calculating mechanism coöperative therewith for performing special calculations in respect to each transaction set up on the adding machine, controlling and actuating instrumentalities for the adding machine, operative connections intermediate said instrumentalities and the calculating mechanism, means to disable said operative connections, a clearing device operable to control the zeroizing of the calculating mechanism, and means intermediate said zeroizing device and the disabling means aforesaid whereby the action of the latter is controlled from the clearing device.

24. In combination, an adding machine, a calculating mechanism coöperative therewith for performing special calculations in respect to each transaction set up on the adding machine, controlling and actuating instrumentalities for the adding machine, operative connections intermediate said instrumentalities and the calculating mechanism, means to disable said operative connections, the said adding machine comprising a suitable accumulator, and the calculating mechanism including registers, a clearing device, and means intermediate said clearing device and the accumulator and registers aforesaid by which to cause simultaneous clearing of the same.

25. In combination, an adding machine, a calculating mechanism coöperative therewith for performing special calculations in respect to each transaction set up on the adding machine, controlling and actuating instrumentalities for the adding machine, operative connections intermediate said instrumentalities and the calculating mechanism including registers, a clearing device, means intermediate said clearing device and the accumulator and registers aforesaid by which to cause simultaneous clearing of the same, a key for disabling the calculating mechanism in respect to the adding machine instrumentalities, and means intermediate the clearing device and said disabling key to cause the same to assume an inactive position to perform its disabling functions if it has previously assumed an operative position for performing such functions.

26. In combination, an adding machine, a calculating mechanism coöperative therewith for performing special calculations in respect to each transaction set up on the adding machine, controlling and actuating instrumentalities for the adding machine, operative connections intermediate said instrumentalities and the calculating mechanism including registers, a clearing device, means intermediate said clearing device and the accumulator and registers aforesaid by which to cause simultaneous clearing of the same, a key for disabling the calculating mechanism in respect to the adding machine instrumentalities, means intermediate the clearing device and said disabling key to cause the same to assume an inactive position to perform its disabling functions if it has previously assumed an operative position for performing such functions, a total key controlling the taking of totals by means of said total taking mechanism, and means operable as an incident to the operation of the clearing device to restore said total key in the event it has been actuated for total taking purposes.

27. In combination, an adding machine, a calculating mechanism coöperative therewith for performing special calculations in respect to each transaction set up on the adding machine, controlling and actuating instrumentalities for the adding machine, operative connections intermediate said instrumentalities and the calculating mechanism, means to disable said operative connections, a clearing device operable to control the zeroizing of the calculating mechanism, means intermediate said zeroizing device and the disabling means aforesaid whereby the action of the latter is controlled from the clearing device, a total key operable to control the action of the total taking mechanism, and means intermediate the clearing device and the total key whereby to restore the latter in the event it has been previously adjusted to a position to act upon the total taking mechanism.

28. In combination, an adding machine comprising an accumulator, controlling amount keys therefor, and a main actuator; a calculating mechanism associated with said machine for making special calculations in respect to each transaction of the accumulator, said calculating mechanism including registers and being controlled from the amount keys of the adding machine; means to clear the registers of said calculating mechanism; and means operable by said clearing means to control the normalizing of the amount keys.

29. In combination, an adding machine comprising an accumulator, controlling amount keys therefor, and a main actuator; a calculating mechanism associated with said machine for making special calculations in respect to each transaction of the accumulator, said calculating mechanism including registers and being controlled from the amount keys of the adding machine; means intermediate the actuator and the calculating registers for controlling operation of the latter; a clearing device for simultaneously clearing the registers aforesaid and also the accumulator; and means operable by said clearing device to cause normalizing of operated amount keys as an incident to the complete operation of the adding machine.

30. In combination, an adding machine comprising an accumulator, controlling amount keys therefor, a main actuator, and total taking mechanism; a calculating mechanism associated with said machine for making special calculations in respect to each transaction of the accumulator, said calculating mechanism including registers and being controlled from the amount keys of the adding machine; means to clear the registers of said calculating mechanism; means operable by said clearing means to control the normalizing of the amount keys; a key operable to control the action of the total taking mechanism; means for clearing the accumulator and the registers of the calculating mechanism; and means operable from said clearing means to normalize the total key in the event of previous operation of the same.

31. In combination, an adding machine comprising an accumulator, controlling amount keys therefor, a main actuator, and total taking mechanism; a calculating mechanism associated with said machine for making special calculations in respect to each transaction of the accumulator, said calculating mechanism including registers and being controlled from the amount keys of the adding machine; means to clear the registers of said calculating mechanism; means operable by said clearing means to control the normalizing of the amount keys; a key operable to control the action of the total taking mechanism; means for clearing the accumulator and the registers of the calculating mechanism; means operable from said clearing means to normalize the total key in the event of previous operation of the same; means to render the calculating mechanism inactive in relation to the adding machine instrumentalities; and mechanism for causing the last named means to reestablish the operative relation between the calculating mechanism and the adding machine instrumentalities in the event such relation has been disestablished.

32. In a machine of the class described, denominationalizing mechanism comprising manipulative controlling keys arranged according to the different orders of the decimal system, calculating means including a plurality of denominationalizing registers adapted to register different denominations of money required to make up an amount represented by one or more of the operated keys of the different orders of the keyboard, differentially operating members, one for each order of keys of the keyboard, selector mechanism controlled by said differentially operating mechanism of different orders associated with the corresponding orders of the keys and differentially operating members, means intermediate the selector mechanism and the registers whereby the action of the latter is controlled from the selector mechanism, and actuating means for said registers, said selector mechanism including single selectors controlled from a single order of keys only, and combination order selectors adapted to be controlled from keys of different orders of the keyboard.

33. In a machine of the class described, denominationalizing mechanism comprising manipulative controlling keys arranged according to the different orders of the decimal system, calculating means including a plurality of denominationalizing registers adapted to register different denominations of money required to make up an amount represented by one or more of the operated keys of the different orders of the keyboard, differentially operating members, one for each order of keys of the keyboard, selector mechanism controlled by said differentially operating mechanism of different orders associated with the corresponding orders of the keys and differentially operating members, means intermediate the selector mechanism and the registers whereby the action of the latter is controlled from the selector mechanism, and actuating means for said registers, said selector mechanism including selectors corresponding with different denominations of money and therefore corresponding with the said registers, devices of different orders intermediate the differentially operating members and the selectors, each order device connected with the differentially operating member of corresponding order, and connections between certain order devices and a plurality of selectors coöperative with registers of different orders.

34. In a machine of the class described, denominationalizing mechanism comprising manipulative controlling keys arranged according to the different orders of the decimal system, calculating means including a plurality of denominationalizing registers adapted to register different denominations of money required to make up an amount represented by one or more of the operated keys of the different orders of the keyboard, differentially operating members, one for each order of keys of the keyboard, selector mechanism controlled by said differentially operating mechanism of different orders associated with the corresponding orders of the keys and differentially operating members, means intermediate the selector mechanism and the registers whereby the action of the latter is controlled from the selector mechanism, and actuating means for said registers, said selector mechanism including a plurality of selectors coöperative to select for operation registers for different denominations of money, order shafts of different orders corresponding with those of the keys and differentially operating members, a connection between each order shaft and its differentially operating member of corresponding order, and a connection or connections intermediate each order shaft and one or more of the selectors aforesaid.

35. In a machine of the class described, denominationalizing mechanism comprising manipulative controlling keys arranged according to the different orders of the decimal system; calculating means including a plurality of denominationalizing registers adapted to register different denominations of money required to make up an amount represented by one or more of the operated keys of the different orders of the keyboard; differentially operating members, one for each order of keys of the keyboard; selector mechanism controlled by said differentially operating mechanism of different orders associated with the corresponding orders of the keys and differentially operating members; means intermediate the selector mechanism and the registers whereby the action of the latter is controlled from the selector mechanism; actuating means for said registers; said selector mechanism including a plurality of selectors coöperative to select for operation registers for different denominations of money, order shafts of different orders corresponding with those of the keys and differentially operating members, a connection between each order shaft and its differentially operating member of corresponding order, and a connection or connections intermediate each order shaft and one or more of the selectors aforesaid; accumulating mechanism controllable by the amount keys of different orders and operatively connected with the differentially operating members aforesaid and thereby with the denominationalizing mechanism; and means for disabling the operative connection intermediate the accumulating mechanism and said denominationalizing mechanism whereby one of them may be operated alone.

36. In a machine of the class described, denominationalizing mechanism comprising manipulative controlling keys arranged according to the different orders of the decimal system, calculating means including a plurality of denominationalizing registers adapted to register different denominations of money required to make up an amount represented by one or more of the operated keys of the different orders of the keyboard, differentially operating members, one for each order of keys of the keyboard, selector mechanism controlled by said differentially operating mechanism of different orders associated with the corresponding orders of the keys and differentially operating members, means intermediate the selector mechanism and the registers whereby the action of the latter is controlled from the selector mechanism, and actuating means for said registers including an operating member for each register adapted to operate the same if selected by the associated selector mechanism.

37. In a machine of the type set forth, in combination, manual means for predetermining accounting transactions, separate accounting instrumentalities for performing separate arithmetical calculations with respect to the amount predetermined by said manual means, and controlling and operating mechanism for actuating the separate accounting instrumentalities and including a main actuator coöperative with the said accounting instrumentalities to clear both of them, or one of them alone dependent upon the operation of the controlling mechanism.

38. In combination, an accounting machine including accumulating mechanism, differentially operating members for actuating said accumulating mechanism, manipulative devices to control the action of said differentially operating members and arranged in accordance with the different orders of the decimal system, one of said differentially operating members being provided for each order of the manipulative devices, a main actuator for said accounting machine, a denominationalizing and registering mechanism embodying a plurality of registers of different orders corresponding with the orders of the manipulative devices aforesaid, selector mechanism comprising selectors of different orders connected with corresponding orders of the differentially operating members, register operating devices controlled by the selectors to make certain special calculations in relation to items accumulated by the accounting machine, and means for controlling the operation of these said register operating devices from the main actuator of the accounting machine.

39. In a machine of the class described, denominationalizing mechanism comprising manipulative controlling keys arranged according to the different orders of the decimal system, calculating means including a plurality of denominationalizing registers adapted to register different denominations of money required to make up an amount represented by one or more of the operated keys of the different orders of the keyboard, differentially operating members one for each order of keys of the keyboard, selector mechanism controlled by said differentially operating mechanism of different orders associated with the corresponding orders of the keys and differentially operating members, means intermediate the selector mechanism and the registers whereby the action of the latter is controlled from the selector mechanism, and actuating means for said registers including an operating member for each register adapted to operate the same if selected by the associated selector mechanism, and means for clearing said registers comprising a clearing sector, shafts supporting the registers of the calculating mechanism and geared to said clearing sector, means to hold the clearing sector in an inoperative position whereby said shafts are locked against movement and operable to connect the sector with the actuating means above referred to so as to effect the clearing of the registers as an incident to the operation of the denominationalizing mechanism.

40. In a machine of the class described, denominationalizing mechanism comprising manipulative controlling keys arranged according to the different orders of the decimal system, calculating means including a plurality of denominationalizing registers adapted to register different denominations of money required to make up an amount represented by one or more of the operated keys of the different orders of the keyboard, differentially operating members one for each order of keys of the keyboard, selector mechanism controlled by said differentially operating mechanism of different orders associated with the corresponding orders of the keys and differentially operating members, means intermediate the selector mechanism and the registers whereby the action of the latter is controlled from the selector mechanism, and actuating means for said registers including an operating member for each register adapted to operate the same if selected by the associated selector mechanism, and means for clearing the said registers comprising a clearing sector, shafts supporting the registers of the calculating mechanism and geared to said clearing sector, means to hold the clearing sector in an inoperative position whereby said shafts are locked against movement and operable to connect the sector with the actuating means above referred to so as to effect the clearing of the registers as an incident to the operation of the denominationalizing mechanism, and mechanism for retarding the movement of the clearing sector when the same is rendered operative by its controlling means, and means for likewise retarding the speed of movement of the register operating members.

41. In a registering machine, denominationalizing mechanism comprising a plurality of separate registers independently operable to register different denominations of money, operating devices for said registers, selector mechanism controlling the selection of a predetermined one or more of said registers for action, manipulative devices governing the operation of said selector mechanism, the manipulative devices being arranged in orders according to the decimal system, and operating means intermediate the selector mechanism and the manipulative devices comprising differentially movable members disposed in orders corresponding with the orders of the manipulative devices, certain of said differentially movable members being adapted to control a plurality of the registers.

42. In a registering machine, denominationalizing mechanism including manipulative keys arranged according to the different orders of the decimal system, registers adapted to register different denominations of money, certain of said registers registering denominations of money corresponding with a single order of the said keys, other of said registers registering denominations of money corresponding with combinations of orders of said keys, operating means for the registers, differentially operating members controlled by the keys and arranged in orders corresponding with the orders of the keys, and selector mechanism intermediate said differentially operating members and the operating means for the registers including selectors each controlled by a single order of the keys and other selectors adapted to be controlled by two orders of the keys.

43. In a registering machine, denominationalizing mechanism including manipulative keys arranged according to the different orders of the decimal system, registers adapted to register different denominations of money, certain of said registers registering denominations of money corresponding with a single order of the said keys, other of said registers registering denominations of money corresponding with combinations of orders of said keys, operating means for the registers, differentially operating members controlled by the keys and arranged in orders corresponding with the orders of the keys, selector mechanism intermediate said differentially operating members and the operating means for the registers including selectors each controlled by a single order of the keys and other selectors adapted to be controlled by two orders of the keys, a plurality of order devices corresponding with the orders of the keys, means to communicate movement to said order devices from corresponding orders of the differentially operating members, and means to communicate movement from the order devices to the selectors.

44. In combination, an adding machine comprising controlling and operating mechanism, a registering mechanism associated therewith, means to control and actuate the registering mechanism from the controlling and actuating means of the adding machine, an energy storing device forming a part of said registering mechanism, means to connect and disconnect said registering mechanism in relation to the adding machine, and means to simultaneously couple and uncouple respectively the said energy storing device with regard to the adding machine.

45. In combination, an adding machine comprising controlling and actuating instrumentalities, a registering mechanism associated with said machine for making special calculations relative to various transactions performed upon the adding machine, an energy storing device to coöperate with the actuating instrumentality of the adding machine incident to conjoint action of the latter and the said registering mechanism, and means to control the coöperation of said adding machine and registering mechanism likewise controlling the coaction between said energy storing device and the actuating instrumentality referred to.

46. In combination, an adding machine comprising an accumulator, manipulative controlling keys therefor and actuating means, a special registering mechanism separate from the adding machine but adapted to coöperate therewith for making calculations simultaneously with those performed upon the adding machine, operative connections intermediate the manipulative keys and the registering mechanism, means to render said connections active or inactive as required, an energy storing device adapted to coöperate with the actuating means above referred to, and means to maintain said energy storing device active or inactive in correspondence with the activity or inactivity of the said operative connections between the manipulative keys and the registering mechanism.

47. In combination, an adding machine comprising an accumulator, manipulative controlling keys therefor and a main actuator, a denominationalizing mechanism comprising registers for making special calculations in respect to transactions performed by the adding machine, selector mechanism controlled from said manipulative keys to determine the action of said registers, operative connections between the selector mechanism and controlling mechanism of the adding machine, means for rendering said connections operative or inoperative as required, an energy storing spring, and means to connect said spring with the main actuator when said connections are rendered operative.

48. In combination, an adding machine including accumulating mechanism, manipulative keys controlling the operation of said mechanism, a main actuator for operating the accumulating mechanism, a denominationalizing mechanism including registers, means whereby the latter is controlled from the manipulative keys, means whereby said denominationalizing mechanism is operated incident to the operation of the adding machine, and means common to the accumulating and denominationalizing mechanisms to clear the accumulating and registering instrumentalities of the same, respectively.

49. In a machine of the class set forth, the combination with adding mechanism and means to control and operate the same for accumulating items, of a separate calculating mechanism operable in association with said adding mechanism and including registering mechanism, means to disable the calculating mechanism, and means to positively lock the calculating mechanism against accidental operation controlled by said disabling means.

50. In a machine of the class set forth, the combination with adding mechanism and means to control and operate the same for accumulating items, of a separate calculating mechanism operable in association with said adding mechanism and including registering mechanism, means to disable the calculating mechanism, means to positively lock the calculating mechanism against accidental operation controlled by said disabling means, and a clearing device common to the adding and calculating mechanism and coacting with said lock means.

51. In a machine of the class set forth, the combination with adding mechanism and means to control and operate the same for accumulating items, of a separate calculating mechanism operable in association with said adding mechanism and including registering mechanism, means to disable the calculating mechanism, means to positively lock the calculating mechanism against accidental operation controlled by said disabling means, a clearing device common to the adding and calculating mechanism and coacting with said lock means, and a total taking mechanism also coöperative with the lock means.

52. The combination with an accounting machine including accumulating mechanism, differentially operating members controlling said mechanism, manipulative keys to control the action of said differentially operating members and arranged according to the different orders of the decimal system, there being one differentially operating member for each order of the keys, a main actuator for said accounting machine, a denominationalizing registering mechanism embodying a plurality of registers of different orders corresponding with the orders of keys aforesaid, selector mechanism comprising selectors of different orders connected with corresponding orders of the differentially operating members of the accounting machine, register operating devices controlled by the selectors to make certain calcul ons in reference to items accumulated by the accounting machine, and means to control the action of said register operating devices from the main actuator of the accounting machine.

53. The combination with an accounting machine including accumulating mechanism, differentially operating members controlling said mechanism, manipulative keys to control the action of said differentially operating members and arranged according to the different orders of the decimal system, there being one differentially operating member for each order of the keys, a main actuator for said accounting machine, a denominationalizing registering mechanism embodying a plurality of registers of different orders corresponding with the orders of keys aforesaid, selector mechanism comprising selectors of different orders connected with corresponding orders of the differentially operating members of the accounting machine, register operating devices controlled by the selectors to make certain calculations in reference to items accumulated by the accounting machine, means to control the action of said register operating devices from the main actuator of the accounting machine, and means to render the denominationalizing mechanism inactive in respect to the coöperative instrumentalities of the accounting machine.

54. In combination, an adding mechanism, a paying mechanism, controlling and operating means for the adding mechanism whereby money equivalent to amounts accumulated by the latter mechanism may be paid out from the machine, a denominationalizing mechanism for registering the number of pieces of money of different denominations required to make up an amount of a transaction of the adding mechanism, means to render the denominationalizing mechanism inoperative, and means operable incident to rendering the denominationalizing mechanism inoperative for throwing the paying mechanism into action.

55. In combination, an adding mechanism, a paying mechanism, controlling and operating means for the adding mechanism whereby money equivalent to amounts accumulated by the latter mechanism may be paid out from the machine, a denominationalizing mechanism for registering the number of pieces of money of different denominations required to make up an amount of a transaction of the adding mechanism, means to render the denominationalizing mechanism inoperative, and means operable incident to rendering the denominationalizing mechanism inoperative for throwing the paying mechanism into action and vice versa.

56. In combination, an adding mechanism, a paying mechanism, controlling and operating means for the adding mechanism whereby money equivalent to amounts accumulated by the latter mechanism may be paid out from the machine, a denominationalizing mechanism for registering the number of pieces of money of different denominations required to make up an amount of a transaction of the adding mechanism, and means operable incident to rendering the denominationalizing mechanism inoperative for throwing the paying mechanism into action, said last named means including a controlling device enabling the denominationalizing and paying mechanisms to remain inoperative at the same time.

57. In combination, an adding mechanism, a paying mechanism, controlling and operating means for the adding mechanism whereby money equivalent to amounts accumulated by the latter mechanism may be paid out from the machine, a denominationalizing mechanism for registering the number of pieces of money of different denominations required to make up an amount of a transaction of the adding mechanism, and means operable incident to rendering the denominationalizing mechanism inoperative for throwing the paying mechanism into action, said last named means including a controlling device enabling the denominationalizing and paying mechanisms to remain inoperative at the same time and means for clearing the adding and denominationalizing mechanisms adapted to operate said controlling device.

58. In combination, an adding mechanism including accumulating means, a denominationalizing mechanism, a paying mechanism, manipulative instrumentalities common to all of said mechanisms, means to disable either the denominationalizing or the paying mechanisms, and means to render one of the last mentioned mechanisms active as an incident to the operation of disabling the other mechanism.

59. The combination, with an adding machine including accumulating mechanism, amount indexing means and differentially moving members controlled by said indexing means and controlling the accumulating mechanism, of mechanism coöperative with the indexing means and differentially moving members to automatically divide an amount predetermined by the indexing means into different denominations of money and indicating the quantity of pieces of money of different denominations required to make up said amount.

60. A machine for payroll work, the same comprising manipulative devices operable in accordance with any amount between a predetermined minimum and maximum capacity of said machine, means for adding together various amounts adapted to be set up on the machine by said manipulative devices.

means for dividing each amount set up by operation of said manipulative devices into the different denominations of money of a predetermined system of coinage required to make up said amount, a conjointly operable mechanism for paying out money corresponding with each amount set up on the manipulative devices aforesaid, and means to disable the last mechanism without rendering the dividing means inoperative.

61. A machine for payroll work, the same comprising manipulative devices operable in accordance with any amount between a predetermined minimum and maximum capacity of said machine, means for adding together various amounts adapted to be set up on the machine by said manipulative devices, means for dividing each amount set up by operation of said manipulative devices into the different denominations of money of a predetermined system of coinage required to make up said amount, a mechanism for paying out money corresponding with each amount set up on the manipulative devices aforesaid, means for rendering inoperative either the paying out mechanism or the dividing means, means for rendering the dividing means inoperative as an incident to rendering the paying out mechanism operative, and vice versa.

62. A machine for payroll work, the same comprising manipulative devices operable in accordance with any amount between a predetermined minimum and maximum capacity of said machine, means for adding together various amounts adapted to be set up on the machine by said manipulative devices, means for dividing each amount set up by operation of said manipulative devices into the different denominations of money of a predetermined system of coinage required to make up said amount, a mechanism for paying out money corresponding with each amount set up on the manipulative devices aforesaid, means for rendering inoperative either the paying out mechanism or the dividing means, means for rendering the dividing means inoperative as an incident to rendering the paying out mechanism operative, and vice versa, said means including a controlling device enabling the dividing and paying out instrumentalities to operate simultaneously.

63. In a machine for payroll work, the combination of manipulative and operating instrumentalities operable in accordance with different amounts, paying out mechanism controlled thereby, a device for disabling said mechanism in relation to the first mentioned means, a device for disabling the denominationalizing mechanism, and a controlling device intermediate the said disabling devices whereby when one of the said disabling devices is operated for disabling purposes the other may be acted upon to render its associated mechanism operable.

64. In a machine for payroll work, the combination of manipulative and operating instrumentalities operable in accordance with different amounts, paying out mechanism controlled thereby, a device for disabling said mechanism in relation to the first mentioned means, a denominationalizing mechanism, a device for disabling the denominationalizing mechanism, and a controlling device intermediate the said disabling devices whereby when one of the said disabling devices is operated for disabling purposes the other may be acted upon to render its associated mechanism operable, each disabling device comprising a depressible key having a cam projection to lock it depressed, and the controlling device comprising a slide operable incident to the camming action of the said cam projections.

65. In combination, an accounting machine comprising accumulating mechanism, means controlling the operation of said mechanism for listing totals and sub-totals, a denominationalizing mechanism for dividing up each amount of a transaction of the accumulating mechanism into denominations of money required to make up such amount according to a predetermined coinage system and operable conjointly with the accumulating and listing instrumentalities, means to disable the accumulating mechanism, listing mechanism adapted to list the amount of each transaction of the machine either accumulated or not accumulated, and means to prevent operation of the denominationalizing mechanism when the accumulating mechanism is disabled.

66. In combination, an adding machine, operating means therefor, a calculating mechanism for making special computations in relation to each item or transaction performed by the adding machine and coöperatively associated with the latter, means whereby the operation of the calculating mechanism may be discontinued at will, and means for interfering with such discontinuance of operation of the calculating mechanism when the operating means for the adding machine is in other than normal position.

67. In combination, an adding machine including an accumulator, means for controlling and operating the same, a denominationalizing mechanism for dividing transactions performed on the adding machine into amounts equivalent to different denominations of money required to make up each separate amount of the adding machine transactions, means controlling coöperative and independent operation of the adding machine and denominationalizing mechanism, and interference means whereby to prevent actuation of the last mentioned means when the operating means for the adding machine is in other than normal position.

68. In combination, an adding machine, controlling and operating means therefor, a denominationalizing mechanism for dividing each amount or transaction of the adding machine into amounts equivalent to different denominations of money required to make up the same, the controlling and operating means for the adding machine including differentially operating members, and the denominationalizing mechanism including selecting mechanism connected with said differentially operating members, means for disabling the connections between said selecting mechanism and the operating members and restoring said connections, and a device for preventing the disabling and restoring action aforesaid excepting when the controlling means for the adding machine is in its normal position.

69. In combination, an adding machine comprising an accumulator, controlling and operating means therefor, a governor controlling the action of said operating means during a certain period of its operation, a calculating mechanism for making special computations in relation to transactions performed by the adding machine and including register operating means, and means intermediate said calculating mechanism and said governor whereby the action of said register operating means is also controlled from the governor, but at a speed other than that in which the governor controls the first mentioned operating means.

70. In combination, a registering machine, controlling and operating means therefor, a denominationalizing mechanism associated therewith and including registers for making special computations in relation to transactions of the registering machine, operating connections between the said controlling and operating means and said registers, means for clearing the last mentioned registers, and means for connecting and disconnecting the said clearing means with respect to the operating means of the registering machine.

71. In combination, a registering machine, controlling and operating means therefor, a denominationalizing mechanism associated therewith and including registers for making special computations in relation to transactions of the registering machine, operating connections between the said controlling and operating means and said registers, means for clearing the last mentioned registers, and means for connecting and disconnecting the said clearing means with respect to the operating means of the registering machine, and comprising an instrumentality for locking the denominationalizing registers against clearing movement.

72. In combination, a registering machine, controlling and operating means therefor, a denominationalizing mechanism associated therewith and including registers for making special computations in relation to transactions of the registering machine, means for clearing the last mentioned registers, means to connect said clearing means with the operating means for the registering machine whereby the clearing of the denominationalizing registers will take place as an incident to operation of said registering machine, and means to lock the last mentioned means in a predetermined position whereby to lock the denominationalizing registers against clearing movement.

73. In a selecting mechanism, the combination of a selector shaft, selector holding means on said shaft comprising a strip seated in the shaft, selectors fitted on the shaft and interlocked with said strip at intervals, and means for moving the selectors on the shaft while maintaining the interlocking connection between the same and said strip.

74. In a selecting mechanism, the combination of a selector shaft, selector holding means thereon comprising angularly arranged strips seated lengthwise in the shaft and formed with notches at intervals in its length, selectors mounted on said shaft and provided with openings receiving the shaft, the said openings being formed with slots radiating therefrom and disposed in angular relation corresponding with the angularity of the strips aforesaid, the selectors being assembled on the shaft by movement lengthwise thereof with the strips entering the slots, and means to move the selectors rotatively on the shaft with the portions of the selectors intermediate the slots aforesaid interlocked with the strips by operating in the notches of the latter.

75. The combination with an accounting machine, operating means therefor and a speed governor, of a calculating mechanism associated with said machine and including registers, actuating devices for said registers, clearing mechanism for the registers, and means intermediate said speed governor and the actuating devices and the clearing mechanism whereby the latter are controlled by said governor.

76. The combination with an accounting machine, operating means therefor and a speed governor, of a calculating mechanism associated with said machine and including registers, actuating devices for said registers, selecting and clearing mechanism for the registers, and means intermediate said speed governor and the actuating devices and the selecting and clearing mechanism whereby the latter are controlled by said governor.

77. The combination with an accounting machine, operating means therefor and a speed governor, of a calculating mechanism associated with said machine and including registers, actuating devices for said registers, clearing mechanism for the registers, and means intermediate the clearing mechanism and the speed governor whereby the clearing operation is controlled by the governor.

78. The combination with an accounting machine, operating means therefor and a speed governor, of a calculating mechanism associated with said machine and including registers, actuating devices for said registers, selecting and clearing mechanism for the registers, and means intermediate the selecting and clearing mechanism and the speed governor whereby the selecting and clearing operations are controlled by the governor.

79. The combination with an accounting machine, operating means therefor and a speed governor, of a calculating mechanism associated with said machine and including registers, actuating devices for said registers, selecting mechanism for the registers, and means intermediate the selecting mechanism and the speed governor whereby the selecting operation is controlled by the governor.

80. The combination with an accounting machine, operating means therefor and a speed governor, of a calculating mechanism associated with said machine and including registers, clearing devices for said registers, and means intermediate said speed governor and the clearing devices whereby the latter are controlled by said governor.

81. The combination with an accounting machine, operating means therefor and a speed governor, of a calculating mechanism associated with said machine and including registers, clearing and selecting devices for said registers, and means intermediate said speed governor and the clearing and selecting devices whereby the latter are controlled by said governor.

82. The combination with an accounting machine, operating means therefor and a speed governor, of a calculating mechanism associated with said machine and including registers, selecting devices for said registers, and means intermediate said speed governor and the selecting devices whereby the latter are controlled by said governor.

83. The combination with an accounting machine, operating means therefor and a speed governor, of a calculating mechanism associated with said machine and including registers, actuating devices for said registers, means intermediate said speed governor and the actuating devices whereby the latter are controlled by said governor, and means to render the actuating devices inoperative in relation to said governor.

84. The combination with an accounting machine, operating means therefor and a speed governor, of a calculating mechanism associated with said machine and including registers, actuating devices for said registers, clearing mechanism for the registers, means intermediate the clearing mechanism and the speed governor whereby the clearing operation is controlled by the governor, and an instrumentality whereby the clearing mechanism may be disabled in relation to the governor.

85. The combination with an accounting machine, operating means therefor and a speed governor, of a calculating mechanism associated with said machine and including registers, clearing and selecting devices for said registers, means intermediate said speed governor and the clearing and selecting devices whereby the latter are controlled by said governor, and means to render the selecting devices inoperative in relation to said governor.

86. The combination with an accounting machine, operating means therefor and a speed governor, of a calculating mechanism associated with said machine and including registers, actuating devices for said registers, selecting and clearing mechanism for the registers, means intermediate the selecting and clearing mechanism and the speed governor whereby the selecting and clearing operation is controlled by the governor, and means for connecting and disconnecting the selecting and clearing means in respect to the governor.

87. In a machine for denominationalizing monetary amounts, the combination of operating means, a registering mechanism, manipulative controlling devices for the registering mechanism including selectors, and a governor to control the speed of operation of the selectors.

88. In a machine for denominationalizing monetary amounts, the combination of operating means, a registering mechanism, manipulative controlling devices for the registering mechanism, clearing mechanism for the registers, and a speed governor to control the action of said clearing mechanism.

89. In a machine for denominationalizing monetary amounts, the combination of operating means, a registering mechanism, manipulative controlling devices for the registering mechanism including selectors, clearing mechanism for the registers, and a speed governor to control the action of said clearing mechanism as well as the speed with which the selectors operate.

90. In a machine for denominationalizing monetary amounts, the combination of operating means, a registering mechanism, manipulative controlling devices for the registering mechanism including selectors, clearing mechanism for the registers, and a speed governor to control the action of said clearing mechanism as well as the speed with which the selectors and operating means operate.

91. In a machine for denominationalizing monetary amounts, the combination of operating means, a registering mechanism, manipulative controlling devices for the registering mechanism including selectors, clearing mechanism for the registers, and a speed governor to control the action of said clearing mechanism as well as the speed with which the operating means may be actuated.

92. In a machine for denominationalizing monetary amounts, the combination of operating means, a registering mechanism, manipulative controlling devices for the registering mechanism including selectors, clearing means for the registering mechanism, and a speed governor common to the operating, clearing and selector means.

93. In a machine for denominationalizing monetary amounts, the combination of operating means, a registering mechanism, manipulative controlling devices for the registering mechanism, clearing mechanism for the registers, and a speed governor common to the operating and registering means to control the action of said clearing mechanism.

94. In combination, an accounting machine, operating means therefor, a calculating mechanism associated therewith for making special calculations incident to the operation of the accounting machine, a restoring instrumentality for the calculating mechanism, means to place said restoring instrumentality in and out of gear in relation to the operating means aforesaid, and means to render the calculating mechanism active as the restoring instrumentality is placed in gear, respectively, as aforesaid.

95. In combination, a main accounting machine, operating means therefor, a calculating mechanism associated therewith for making special calculations incident to the operation of the accounting machine, a restoring instrumentality for the calculating mechanism separate from the main accounting machine, and means to place said restoring instrumentality in and out of gear in relation to the operating means aforesaid.

96. In combination, a main accounting machine, operating means therefor, a calculating mechanism associated therewith for making special calculations incident to the operation of the accounting machine, a restoring instrumentality for the calculating mechanism separate from the main accounting machine, means to place said restoring instrumentality in and out of gear in relation to the operating means aforesaid, and means to change the operative relation of the calculating mechanism in regard to the accounting machine.

97. In combination, an accounting machine, operating means therefor, a calculating mechanism associated therewith for making special calculations incident to the operation of the accounting machine, a restoring instrumentality for the calculating mechanism, means to place said restoring instrumentality in and out of gear in relation to the operating means aforesaid, and means to change the operative relation of the calculating mechanism in regard to the accounting machine and simultaneously control the gearing of the restoring instrumentality.

98. In a machine of the class described registering mechanism, and selector mechanism therefor comprising a register controlling lever to actuate the registering mechanism, a selector device corresponding with one order, a selector device of a second order, and means pivoted on and thereby coöperative with the controlling member and with both said selector devices to govern the action of the controlling member in respect to the registering mechanism.

99. In a machine of the class described, registering mechanism, and selector mechanism therefor comprising a register controlling member, selector devices corresponding with units and tens orders of the decimal system, said devices being so formed as to govern movement of the said controlling member, and a movable element mounted upon said controlling member for direct engagement with the selector devices aforesaid whereby to hold the controlling member against operating movement under a certain condition of adjustment of the selector devices, and permit of movement of said controlling member under other conditions of adjustment of the selector devices.

100. Selector mechanism for registering machines comprising units and tens selector members, a register controlling member, a movable element mounted on said register controlling member and having spaced portions adapted to engage with the said selector members, and means for setting the selector members in different positions in which the said movable element will operate in a neutral capacity to prevent operative movement of the controlling member, and in which positive movement of the movable element is permitted whereby operating movement of the controlling member is allowed in accordance with a predetermined relative adjustment of said selector members.

101. Selector mechanism for registering machines comprising a controlling lever adapted to control the operation of a register, units and tens selector members, means for differentially moving said selector members, a movable contacting element carried by the controlling lever and coöperative with the selector members, said selector members being formed so that by assuming predetermined relative positions they coöperate with the movable element to maintain the said controlling member neutral or inoperative whereas by assuming other relative positions movement of said movable element and its controlling lever are allowed for register operating purposes.

102. A combination selector for registering machines comprising units and tens selector members, each member including a main selector and an auxiliary selector, and register controlling means associated with said selector including a lever, and a movable element pivoted between its ends to said lever and having end members engageable with the main and auxiliary selector members aforesaid.

103. A combination selector for registering machines comprising units and tens selector members, each member including a main selector, and an auxiliary selector, and register controlling means associated with said selector including a lever, and a movable element pivoted between its ends to said lever and having end members engageable with the main and auxiliary selector members aforesaid, said selector members being so formed as to prevent movement of the said lever and to permit movement of said lever, according to predetermined relative adjustments of the said members.

104. Selector mechanism comprising a combination selector consisting of units and tens selecting devices, units manipulative keys controlling the units selecting device and tens manipulative keys controlling the tens selecting device, a register operating member and a pivoted element engageable with said units and tens selecting devices, said selecting devices being so formed that by certain engagement with said pivoted element movement of the register operating member is prevented while by other engagement with the pivoted element movement of the register operating member is permitted and selection takes place.

105. Selector mechanism of the class described comprising a register operating lever, units and tens devices, manipulative means to differentially position said devices, each of the devices comprising rotative parts, and a pivoted element carried by the operating lever and having means at its opposite ends engageable with the selector devices so as to permit or prevent movement of the said lever.

106. In a machine for registering amounts of money, a twenty-five cent register, an operating member for the same, selector means including units and tens selector devices, means for differentially operating said devices to set the same in positions at different adjustments, and means intermediate said operating member and said selector devices for preventing and permitting movement of the operating member according to the adjustment of the selector devices.

107. In a machine for registering amounts of money, a twenty-five cent register, an operating member for the same, selector means including units and tens selector devices, means for differentially operating said devices to set the same in positions at different adjustments, and means intermediate said operating member and said selector devices for preventing and permitting movement of the operating member according to the adjustment of the selector devices, the last mentioned means comprising a plate pivoted between its end to the operating member and having end members coöperative with the selector devices, the latter being formed with differently arranged surfaces to coact with said plate whereby operating movement of the operating member is prevented or permitted.

108. In combination, an accounting machine comprising mechanism for accumulating items in the operation of said machine, a calculating mechanism associated with said accounting machine and including a plurality of registers adapted to register money of different denominations required to make up each item accumulated, means to clear the accumulating mechanism, and means adapted to be controlled to clear said registers as an incident to the operation of the accounting machine.

109. In combination, an accounting machine comprising mechanism for accumulating items in the operation of said machine, a calculating mechanism associated with said accounting machine and including a plurality of registers adapted to register money of different denominations required to make up each item accumulated, means to clear the accumulating mechanism, and means adapted to be controlled to clear said registers as an incident to the operation of the accounting machine, said last named means being adapted to operate the means for effecting clearing of the accumulating mechanism.

110. In combination, an adding mechanism, a paying mechanism, controlling and operating means for the adding mechanism whereby money equivalent to amounts accumulated by the latter mechanism may be paid out from the machine, a denominationalizing mechanism for registering the number of pieces of money of different denominations required to make up an amount of a transaction of the adding mechanism, means operable incident to rendering the denominationalizing mechanism inoperative for throwing the paying mechanism into action, and means operable incident to disabling the paying mechanism for throwing the denominationalizing mechanism into action.

111. In a machine for denominationalizing monetary items, the combination of denominationalizing registers, manipulative means to control the selection of said registers for operation, a main operating means controlling the registering action of the registers, clearing mechanism coöperative with the registers, and means to hold said clearing mechanism at a predetermined adjustment so as to lock the registers against clearing movement and for gearing the clearing mechanism to the main operating means whereby clearing of the registers is accomplished as an incident to the action of said operating means.

112. In a machine for denominationalizing monetary items, the combination of denominationalizing registers, a shaft supporting said registers, a clearing device coöperative with said shaft to effect clearing of the registers, manipulative selectors for controlling the operation of the registers, main operating means for actuating the registers, and means to hold said clearing device in a predetermined position to prevent clearing movement of the registers operable to connect the clearing device with said operating means for the purpose of causing clearing action of the registers.

113. In combination, an accounting machine comprising manipulative controlling and operating instrumentalities, mechanism for denominationalizing monetary items adapted to be set up on said accounting machine and including a plurality of registers, means for maintaining the denominationalizing mechanism inactive, and means controlling clearing of the registers of the denominationalizing mechanism operable to render the latter operative in the event said mechanism is adjusted for inaction.

114. In combination, an accounting machine including manipulative controlling and operating instrumentalities, mechanism for denominationalizing monetary items associated with said accounting machine, means intermediate said controlling and operating instrumentalities and the denominationalizing mechanism for controlling the operation of the latter, a key for disabling the denominationalizing mechanism, said denominationalizing mechanism including registers, a key for controlling clearing of the said registers at will, and means intermediate said keys whereby operation of the clearing key will render the denominationalizing mechanism operative in the event it is adjusted in a condition of inactivity.

In testimony whereof we affix our signatures.

MILES H. MANN.
AMOS H. HAWLEY.